United States Patent
Suzumura et al.

[11] Patent Number: 5,756,052
[45] Date of Patent: May 26, 1998

[54] FLUE GAS TREATMENT SYSTEM

[75] Inventors: Hiroshi Suzumura; Yasuyuki Ogushi; Naohiko Ukawa; Masao Hino; Koosoo Tao, all of Hiroshima; Nobuo Kojima; Kiyoshi Okazoe, both of Tokyo; Kyozo Suyama, Sendai, all of Japan

[73] Assignee: Mitsubishi Jukogyo Kabushiki Kaisha, Tokyo, Japan

[21] Appl. No.: 769,633

[22] Filed: Dec. 18, 1996

[30] Foreign Application Priority Data

Dec. 26, 1995 [JP] Japan .................... 7-338559

[51] Int. Cl.⁶ .................................................. B01D 50/00
[52] U.S. Cl. .......................... 422/171; 422/172; 55/223
[58] Field of Search .......................... 422/171, 172; 55/223; 423/242.1, 242.2, 243.01, 243.08, 243.11, 244.01

[56] References Cited

U.S. PATENT DOCUMENTS

| | | | |
|---|---|---|---|
| 4,147,756 | 4/1979 | Dahlstrom | 423/242 |
| 4,702,893 | 10/1987 | Kirk et al. | 422/173 |
| 4,956,162 | 9/1990 | Smith et al. | 423/244 |
| 4,957,512 | 9/1990 | Denisov et al. | 55/8 |
| 5,344,617 | 9/1994 | Johnson | 422/172 |
| 5,456,891 | 10/1995 | Fattinger et al. | 423/243.9 |
| 5,607,496 | 3/1997 | Brooks | 75/670 |

FOREIGN PATENT DOCUMENTS

| | | |
|---|---|---|
| 604816 | 4/1978 | U.S.S.R. |
| 814846 | 3/1981 | U.S.S.R. |
| 243581 | 8/1993 | U.S.S.R. |

*Primary Examiner*—Nina Bhat
*Attorney, Agent, or Firm*—Michael N. Meller

[57] ABSTRACT

A flue gas treatment system is provided for which is capable of easily treating Se contained in flue gas, comprising an extractor 13 for extracting soluble components in the dust removed by a dry-type dust precipitator 5 into water to slurry the dust; insolubilizer supply 16 for supplying an insolubilizer for insolubilizing at least tetravalent Se to the dust slurry which has been slurried from the dust by the extractor 13; adsorbent supply 14 for supplying an adsorbent composed of an organism material for adsorbing at least hexavalent Se in the dust slurry; and separator 15 for solid-liquid separating the dust slurry to which the insolubilizer and the adsorbent have been supplied by said supplies.

40 Claims, 9 Drawing Sheets

5,756,052

FLUE GAS TREATMENT SYSTEM

BACKGROUND OF THE INVENTION

1. Field of the Invention

The present invention relates to a flue gas treatment system which is capable of treating selenium (Se) in flue gas easily.

2. Description of the Related Art

Heretofore, flue gas treatment systems installed in thermal power stations and the like have been widely used which comprise; a wet flue gas desulfurization apparatus which brings flue gas and a slurry containing a calcium compound (absorbent slurry) into contact with each other in an absorption tower so as to absorb sulfur dioxide contained in the flue gas and to separate gypsum from the slurry in the absorption tower as a by-product; and a dry-type dust precipitator apparatus (which is usually an electric dust precipitator) for removing dust such as fly ash from the flue gas introduced into the wet flue gas desulfurization apparatus. In recent years, there has been a problem in treating harmful impurities besides sulfur oxides contained in flue gas. In particular, flue gas treatment systems for coal burning boilers, in recent years, have encountered problems related to harmful selenium (Se) contained in the coal having a content of approximately not more than 10 mg/kg. Thus, the removal of it from flue gas or from a drainage has been required.

It should be noted that Se exists in tetravalent Se (main form: selenious acid $SeO_3^{2-}$), which can easily be insolubilized by an insolubilizer, or hexavalent Se (main form: selenic acid: $SeO_4^{2-}$), which cannot easily be subjected to insolubilizing treatment. In particular, highly soluble hexavalent Se (solubility: 95% at 20° C.) can easily be eluted. Because Se has a toxicity similar to that of arsenic compounds, and because the cases of physical disorder have happened and effluent regulations exist in various countries around the world, Se became a new item for regulation in February 1994 whereby environment standards (0.01 mg/l), waste water standards (0.1 mg/l) and elution standards relating to the ground embedment (0.3 mg/l) have been regulated.

FIG. 10 shows a conventional example (an example of a flue gas treatment system for a coal burning boiler) of a flue gas treatment system of the foregoing type.

Referring to FIG. 10, flue gas 10 discharged from a coal burning boiler 1 is supplied to a denitration apparatus 2 attached to a boiler 1 so that nitrogen oxides (NOx) of the flue gas 10 are removed. Then, the flue gas 10 is allowed to pass through an air heater 3 and a heat recovery part 4 of a gas-gas heater (GGH), and then introduced into an electric dust precipitator 5 (EP) so that dust such as fly ash is removed. Then, the flue gas is introduced into a wet flue gas desulfurization apparatus 6, where sulfur dioxide is removed. After the flue gas is allowed to pass through a reheating part 7 of the gas-gas heater (GGH), the flue gas is introduced into a smoke stack (not shown) so as to be discharged into the atmosphere. The dust such as fly ash removed by the electric dust precipitator 5 is subjected to an ash treatment so that a portion of the dust is reclaimed as a material for cement and the rest is disposed to an ash disposal place 8.

In the above conventional flue gas treatment system, almost all of Se in the coal (Se in the flue gas) is agglomerated in the downstream such as the air heater 3, and then removed by the electric dust precipitator 5 in a state where Se is contained in the dust of the flue gas. Consequently, it is contained in the waste at the ash disposal place 8 or in the material of cement. Therefore, when the above elution regulation is complied with to make the effluent harmless with regard to Se, there arises a problem that a complicated and costly post-process is required in which the ash removed by the electric dust precipitator 5 is diluted, for example, in a large quantity of water.

SUMMARY OF THE INVENTION

Accordingly, an object of the present invention is to provide a flue gas treatment system which is capable of easily treating Se contained in flue gas.

In order to achieve the object, the present invention provides: (1) a flue gas treatment system for treating flue gas containing sulfur dioxide, dust and Se, comprising a desulfurization apparatus having a desulfurization tower for bringing an absorbent slurry and the flue gas into a gas-liquid contact with each other so as to absorb sulfur dioxide; a dry-type dust precipitator for removing dust such as fly ash from the flue gas before the flue gas is introduced into said desulfurization tower of said desulfurization apparatus; an extractor for extracting a soluble component of the dust which has been removed by said dry-type dust precipitation apparatus, into water to slurry the dust; an insolubilizer supply for supplying an insolubilizer to a dust slurry which has been formed from the dust by said extractor so as to insolubilize at least tetravalent Se; an adsorbent supply for supplying an adsorbent composed of an organism material to said dust slurry so as to adsorb at least hexavalent Se; and a solid-liquid separator for separating the dust slurry to which said insolubilizer and said adsorbent have been added by said supplies.

The present invention also provides: (2) the flue gas treatment system wherein a portion of liquid constituting the absorbent slurry in the desulfurization apparatus described in (1) is introduced into the extractor described in (1) so as to be used as a solvent in the extractor, and a filtrate separated by the separator described in (1) is recycled as liquid that constitutes the absorbent slurry in the desulfurization apparatus.

The present invention provides: (3) the flue gas treatment system comprising a filter aid supply for supplying a filter aid to the dust slurry described in (1) or (2).

The present invention provides: (4) a flue gas treatment system for treating flue gas containing sulfur dioxide, dust and Se, comprising a desulfurization apparatus having a desulfurization tower for bringing an absorbent slurry and the flue gas into a gas-liquid contact with each other so as to absorb sulfur dioxide; a dry-type dust precipitator for removing dust such as fly ash from the flue gas before the flue gas is introduced into said desulfurization tower of said desulfurization apparatus; a dust introducer for introducing the dust removed by said dry-type dust precipitator into the absorbent slurry of said desulfurization apparatus; an insolubilizer supply for supplying an insolubilizer to the absorbent slurry so as to insolubilize at least tetravalent Se; and an adsorbent supply for supplying an adsorbent composed of an organism material to the absorbent slurry so as to adsorb at least hexavalent Se.

The present invention also provides: (5) a flue gas treatment system for treating flue gas containing sulfur dioxide, dust and Se, comprising a desulfurization apparatus having a desulfurization tower for bringing an absorbent slurry and the flue gas into a gas-liquid contact with each other so as to absorb sulfur dioxide, wherein the flue gas having dust such as fly ash not removed is introduced into said desulfurization tower; an insolubilizer supply for supplying an insolubilizer to the absorbent slurry in said desulfurization apparatus so as to insolubilize at least tetravalent Se; and an adsorbent supply for supplying an adsorbent composed of an organism material to the absorbent slurry so as to adsorb at least hexavalent Se.

The present invention further provides: (6) a flue gas treatment system for treating flue gas containing sulfur dioxide, dust and Se, comprising a desulfurization apparatus having a desulfurization tower for bringing absorbent slurry and flue gas into a gas-liquid contact with each other so as to absorb sulfur dioxide and also having a cooling and dust removal tower disposed in an upstream of said desulfurization tower so as to bring liquid and the flue gas into a gas-liquid contact with each other; a dry-type dust precipitator for removing dust such as fly ash from the flue gas, which will be introduced into said cooling and dust removal tower; a dust introducer for introducing the dust removed by said dry-type dust precipitator into the liquid of said cooling and dust removal tower of said desulfurization apparatus; an insolubilizer supply for supplying an insolubilizer to a dust slurry obtained by introducing said dust into said liquid so as to insolubilize at least tetravalent Se; an adsorbent supply for supplying an adsorbent composed of an organism material to said dust slurry so as to adsorb at least hexavalent Se; and a separator for solid-liquid separating the dust slurry to which said insolubilizer and said adsorbent have been added by said supplies.

The present invention provides: (7) a flue gas treatment system for treating flue gas containing sulfur dioxide, dust and Se, comprising a desulfurization apparatus having a desulfurization tower for bringing an absorbent slurry and flue gas into a gas-liquid contact with each other so as to absorb sulfur dioxide and also having a cooling and dust removal tower disposed in an upstream of said desulfurization tower so as to bring liquid and the flue gas into a gas-liquid contact with each other, wherein the flue gas which has not had dust such as fly ash removed is introduced into said cooling and dust removal tower; an insolubilizer supply for supplying an insolubilizer to a dust slurry obtained by supplying the dust to the liquid of said cooling and dust removal tower so as to insolubilize at least tetravalent Se; an adsorbent supply for supplying an adsorbent composed of an organism material to said dust slurry so as to adsorb at least hexavalent Se; and a separator for solid-liquid separating the dust slurry to which said insolubilizer and said adsorbent have been added by said supplies.

The present invention provides: (8) the flue gas treatment system comprising an oxidation-reduction reaction controller for controlling an oxidation-reduction reaction in the desulfurization apparatus described in any one of (1), (2), (3), (4), (5), (6) and (7), so as to carry out a minimum oxidation required to completely oxidize sulfur dioxide in the slurry of the desulfurization apparatus.

The present invention provides: (9) the flue gas treatment system, comprising a drain treatment apparatus for treating a drain from the desulfurization apparatus described in any one of (1), (2), (3), (4), (5), (6), (7) and (8), wherein the drain treatment apparatus is provided with an insolubilizer supply for supplying an insolubilizer to the drain so as to insolubilize at least tetravalent Se, and an adsorbent supply for supplying an adsorbent composed of an organism material to said drain so as to adsorb at least hexavalent Se.

The present invention provides: (10) a flue gas treatment system, comprising a drain treatment apparatus for treating a drain from the desulfurization apparatus described in any one of (1), (2), (3), (4), (5), (6), (7) and (8), wherein the drain treatment apparatus is provided with an insolubilizer supply for supplying an insolubilizer to the said drain so as to insolubilize at least tetravalent Se, and a fixed-floor type contact treatment tower in which an adsorbent composed of an organism material for adsorbing at least hexavalent Se is packed in a fixed state and through which the drain is allowed to pass through.

According to the flue gas treatment system described in (1), almost all of Se in the flue gas can be removed by the dry-type dust precipitator into the dust, resulting in the dust containing Se. When a soluble component of the dust is extracted into water in the extractor, Se is dissolved in the liquid of the dust slurry. At least tetravalent Se in the dust slurry is converted to an insoluble form by the insolubilizer supplied from the insolubilizer supply, and at least hexavalent Se is adsorbed by the adsorbent supplied by the adsorbent supply. Accordingly, the separator discharges almost all of both tetravalent Se and hexavalent Se to the solid phase.

Since hexavalent Se adsorbed by the adsorbent cannot easily be desorbed in natural environment, and since tetravalent Se is also converted to insoluble by the insolubilizer, the aforementioned Se elution regulation can be satisfied even if the solid is disposed without further treatment.

Therefore, a bothersome and costly process wherein the dust is diluted in a large quantity of water and disposed of can be eliminated. Thus, the flue gas treatment system can be operated easily at a reduced cost, while satisfying the Se regulations. Since a large quantity of dust (impurities such as Se) do not enter the slurry in the absorption tower of the desulfurization apparatus, thus desulfurization and the like in the desulfurization apparatus can be maintained satisfactorily.

According to the flue gas treatment system described in (2), a portion of liquid constituting the absorbent slurry of the desulfurization apparatus is used as the solvent for the extractor, and thus the quantity of use (the quantity for circulation) and consumption of water can be reduced as compared with the construction in which water is individually supplied.

According to the flue gas treatment system described in (3), the filter aid is supplied to the mixer or the separator. Therefore, the enhanced dehydration by the separator can produce a solid (i.e., dust cake) having a low water content that can be handled easily.

According to the flue gas treatment system described in (4), almost all portion of Se in the flue gas can be removed by the dry-type dust precipitator by way of dust. Then, the dust containing Se is directly introduced into the slurry in the desulfurization apparatus so as to be extracted in the desulfurization apparatus, where the insolubilizer and the adsorbent will be added. Thus, at least tetravalent Se contained in the flue gas is converted to an insoluble form in the desulfurization apparatus, and also hexavalent Se is adsorbed by the adsorbent in the desulfurization apparatus. Consequently, Se is discharged together with the solid (gypsum or the like) which is separated from the slurry in the desulfurization apparatus, or separated easily as a solid in the drain treatment apparatus for discharging circulation liquid from the desulfurization apparatus.

Therefore, the Se elution regulation and the like can easily be satisfied. Since the desulfurization apparatus also serves as an extractor for dust, the construction of the system can be further simplified as compared to such a construction in which a reaction tower for reducing Se and an extractor, etc., are individually provided.

According to the flue gas treatment system described in (5), almost all of Se in the flue gas is, while being contained in the dust, directly introduced into the desulfurization apparatus together with the flue gas so as to be mixed with the absorbent slurry for extraction, for example, in the absorption tower of the desulfurization apparatus. Then, the insolubilizer and the adsorbent are added. Therefore, at least tetravalent Se contained in the flue gas is converted to an insoluble form in the desulfurization apparatus, and also hexavalent Se is adsorbed by the adsorbent in the desulfurization apparatus. Thus, Se is discharged together with the solid (gypsum or the like) which is separated from the slurry in the desulfurization apparatus, or separated easily as a solid in the drain treatment apparatus for discharging circulation liquid from the desulfurization apparatus.

Therefore, the Se elution regulation and the like can easily be satisfied. Since the desulfurization apparatus also serves as a dust precipitator and an extractor for the dust, the construction of the system can be further simplified as compared to the construction in which a dust precipitator and an extractor are individually provided.

According to the flue gas treatment system described in (6), almost all of Se in the flue gas, is removed by dry-type dust precipitator by way of the dust, and directly introduced, while being contained in the dust, into the liquid for extraction in the cooling and dust removal tower of the desulfurization apparatus. The dust slurry obtained by introducing the dust into the liquid for extraction in the cooling and dust removal tower is supplied with the insolubilizer from the insolubilizer supply so as to convert at least tetravalent Se to insoluble, also supplied with the adsorbent from the adsorbent supply. Therefore, at least tetravalent Se contained in the flue gas is converted to an insoluble form by the insolubilizer in the desulfurization apparatus, and hexavalent Se is adsorbed by the adsorbent in the desulfurization apparatus. Then, Se is separated by the separator to a solid phase (i.e., into the dust cake) for discharge, or separated easily by the subsequent treatment of the separated water to the solid form for disposal or the like.

Therefore, this system can easily satisfy the Se elution regulation and the like. Since the cooling and dust removal tower in this case also serves as an extractor or the like, the construction of the system can further be simplified as compared to the construction in which an extractor, etc., is individually provided. Since a large quantity of dust (i.e., impurities such as Se) is not mixed with the slurry in the absorption tower of the desulfurization apparatus, the performance such as desulfurization in the desulfurization apparatus can be maintained satisfactorily.

According to the flue gas treatment system described in (7), almost all of Se in the flue gas, while being contained in the dust, is directly introduced into the cooling and dust removal tower together with the dust for extraction. The dust slurry extracted by introducing the dust into the liquid in the cooling and dust removal tower, is supplied with the insolubilizer by the insolubilizer supply for converting at least tetravalent Se to insoluble, and is supplied with the adsorbent from the adsorbent supply. Therefore, at least tetravalent Se contained in the flue gas is converted to an insoluble form by the insolubilizer in the desulfurization apparatus, and also hexavalent Se is adsorbed by the adsorbent in the desulfurization apparatus. Then, Se is separated by the separator to a solid phase (i.e., into the dust cake) for discharge, or separated easily by the subsequent treatment of the separated water to a solid for disposal or the like.

Therefore, this system can easily clear the Se elution regulation and the like. Since the desulfurization apparatus serves as a dust precipitator and an extractor for the dust, the construction of the system can be further simplified as compared to the construction in which a dust precipitator and an extractor, etc., are individually provided. Since a large quantity of dust (i.e., impurities such as Se) is not mixed with the slurry in the absorption tower of the desulfurization apparatus, desulfurization and the like in the desulfurization apparatus, can be maintained satisfactorily.

According to the flue gas treatment system described in (8), the oxidation-reduction reaction controller controls the oxidation-reduction reaction of the slurry in the desulfurization apparatus in order to carry out the minimum oxidation reaction required for oxidizing sulfur dioxide completely in the slurry of the desulfurization apparatus. As a result, the production of hexavalent Se by an oxidation of tetravalent Se in the slurry of the desulfurization apparatus can be restrained. Moreover, hexavalent Se is reduced to tetravalent Se. Therefore, the adsorbent supply for adsorbing hexavalent Se, which is located in the withdrawal line of the desulfurization apparatus, or in the drain treatment system for treating drain from the desulfurization apparatus, can be reduced in size. Moreover, the required quantity of the adsorbent can be reduced. Accordingly, an economical advantage is obtained.

According to the flue gas treatment system described in (9), the drain from the desulfurization apparatus is supplied with the insolubilizer for converting at least tetravalent Se to an insoluble form in the drain treatment apparatus. Moreover, the adsorbent composed of the organism material for adsorbing at least hexavalent Se is supplied. Consequently, Se left in the drain can be converted to insoluble or adsorbed in the drain treatment apparatus. Accordingly, the solid-liquid separation in the drain treatment apparatus removes both hexavalent Se and tetravalent Se, and the disposal or the like can be carried out without further treatment.

Therefore, the Se discharge regulation can be satisfied with a significant margin.

According to the flue gas treatment system described in (10), the drain from the desulfurization apparatus is supplied with the insolubilizer for converting at least tetravalent Se to an insoluble form in the drain treatment apparatus, and the drain from the desulfurization apparatus passes through a fixed-floor type contact treatment tower in which an adsorbent composed of an organism material for adsorbing at least hexavalent Se is packed in a fixed state. Therefore, the solid-liquid separation in the drain treatment apparatus separates tetravalent Se among Se left in the drain. Moreover, the adsorbent in the contact treatment tower adsorbs hexavalent Se for separation.

Therefore, the Se discharge regulation can be satisfied with a significant margin.

DETAILED DESCRIPTION OF PREFERRED EMBODIMENTS

Figure 1:
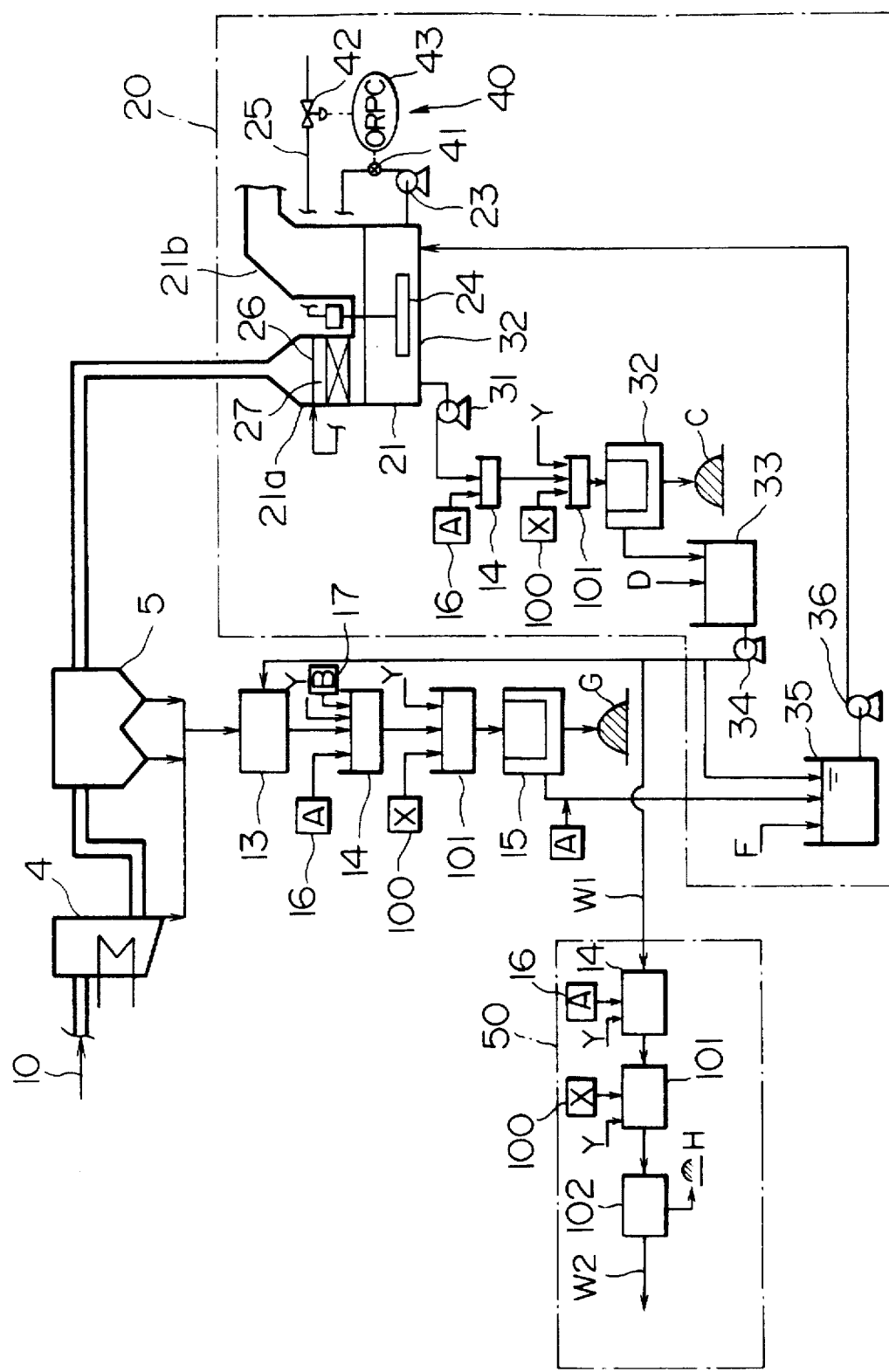
FIG. 1 is a drawing showing the construction of the flue gas treatment system according to Example 1 of the present invention.

The embodiments of the present invention will now be described with reference to the drawings.

First, an adsorbent for use in a flue gas treatment system according to the present invention is described. As an organism material for forming adsorbent X shown in FIG. 1, shell membranes, feathers or wool may be used solely or combined with two or more. Although the organism material may be used in the existing solid form (including membrane) to reduce the number of steps, it may be ground into powder or liquidized for convenience of handling in such cases as storage, transportation, and supply to the apparatus.

As an example, a large amount of eggs are used in the food industry, and the resulting egg shells (egg shells having membranes) are disposed of in a large quantity. Therefore, shell membranes can be obtained in a large quantity from used egg shells in a mayonnaise manufacturing plant at low cost. Egg shells from fowls are first immersed in 5 wt % hydrochloric acid solution for about 10 hours in order to dissolve the egg shells which are composed mainly of calcium carbonate. The remaining shell membranes are washed with distilled water to remove dust and the like, and then dried and washed with 0.1N sodium hydroxide solution to remove the egg whites. Consequently, pure shell membranes which are very effective at adsorbing Se as described below are obtained.

It should be noted that the shell membranes may be used as the adsorbent without being separated from the egg shells. In this case, the pretreatment with hydrochloric acid can be omitted. Egg shells (with membranes) used in a mayonnaise manufacturing plant or the like, may be washed with distilled water without removing the shells, and then dried, and washed with sodium hydroxide solution.

In the pretreatment, feathers or wool are washed, with, for example, 0.1N to 0.5N sodium hydroxide solution, to remove an oil component, and then washed with distilled water. As a result, clean feather or wool having high adsorption capability as described below is obtained.

It should be noted that feathers of various birds (for example, feathers of fowls) may be used.

The adsorbent may be used in various forms, such as solid (including membrane), powder and liquid. For example, the above shell membranes may be used in the form of a membrane without any treatments or in the form of powder after being ground. The shell membranes with shells may be used in the form of solid or powder after being crushed. The feather or the wool may be used in the solid form without any treatment, or in the form of powder yielded by mince.

The shell membranes, feather or wool may be liquidized by being dissolved in alkali solution. For example, the following has been confirmed by a experiment: when the shell membranes, feathers or wool, subjected to the foregoing pretreatment, are immersed in 30 wt % sodium hydroxide solution at room temperature for about 20 hours, they can easily be dissolved. It should be noted that the quantity of the organism material dissolved in this experiment is about 5 g toward 50 cc of sodium hydroxide solution.

Various examples of the flue gas treatment system using the above organism material as the adsorbent X will now be described.

<EXAMPLE 1>

Figure 10:
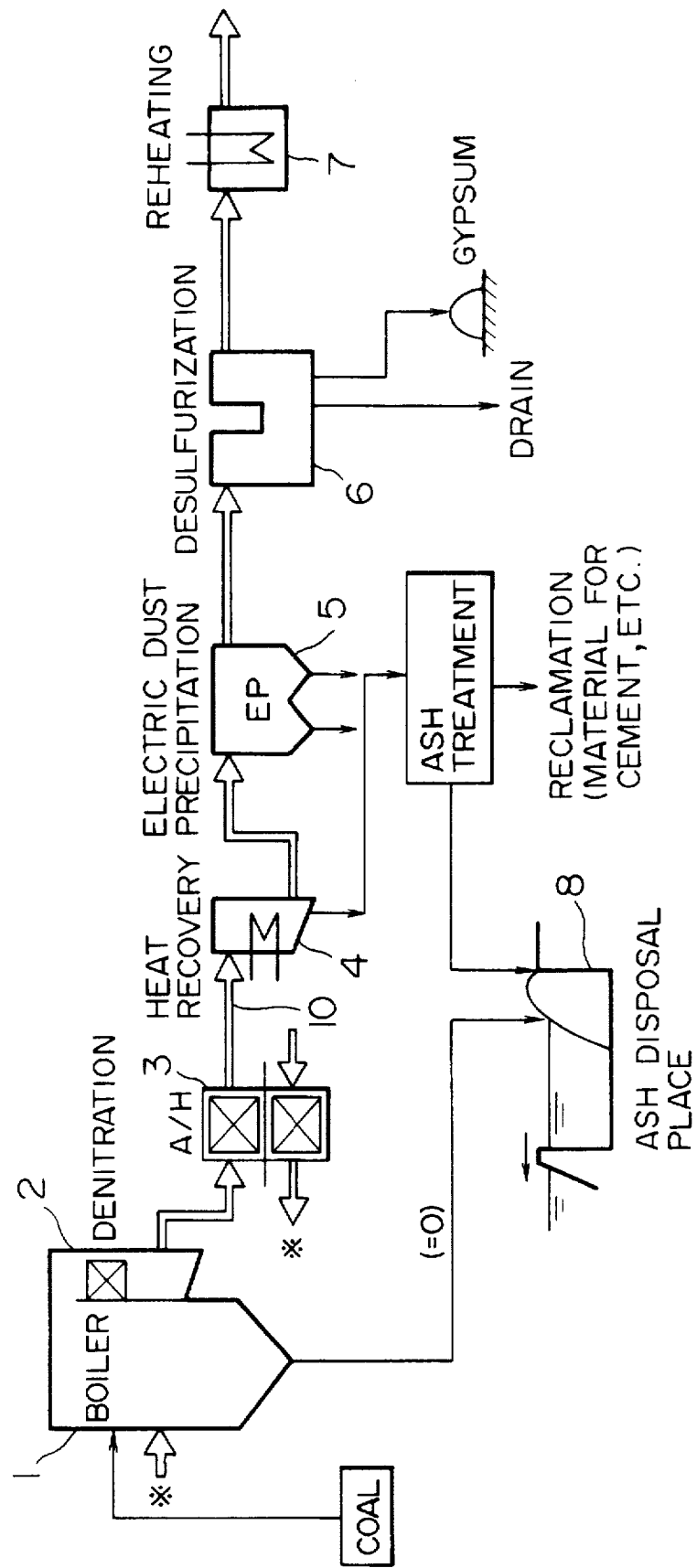
FIG. 10 is a drawing showing the construction of the conventional flue gas treatment system.

Example 1 which is an embodiment of description (1) to (3), (8) and (9) of the present invention is explained with reference to FIG. 1. FIG. 1 is a drawing showing the construction of a flue gas treatment system according to Example 1. The same elements as those of the conventional example in FIG. 10 are given the same reference without explanation.

In the flue gas treatment system according to this example, as shown in FIG. 1, the dust containing Se is collected for removal by an electric dust precipitator 5 or the like, and then the dust (ash) having Se is, by an extractor 13, extracted with liquid supplied from a wet flue gas desulfurization apparatus 20 (hereinafter a desulfurization apparatus 20) so as to be slurried. Then, insolubilizer A is added in a mixer 14 from an insolubilizer supply 16, and then the adsorbent X composed of the foregoing organism material is added in a mixer 101 from a adsorbent supply 100. Then, it is separated by a separator 15 into solid and liquid so that hexavalent Se and tetravalent Se are separated to a solid phase. In this case, a slurry withdrawal line of desulfurization apparatus 20 and a drain treatment apparatus 50 are also provided with a similar construction (the mixer 14, the insolubilizer supply 16, the mixer 101 and the adsorbent supply 100) for treating Se. In this case, in the desulfurization apparatus 20, the minimum oxidation required is performed by a so-called ORP control (oxidation and reduction potential control) to restrain the oxidation of tetravalent Se in the slurry into hexavalent Se so as to facilitate treatment of Se in a drain treatment apparatus 50 and like.

Although FIG. 1 shows a construction in which the mixer 14 is disposed upstream of the mixer 101, a reversed construction may be used in which the mixer 101 is disposed upstream of the mixer 14.

The extractor 13 comprises, for example, a vessel to which the dust is supplied and a stirrer for stirring the slurry in the vessel. As shown in FIG. 1, liquid in a filtrate tank 33 is supplied by a pump 34 of a desulfurization apparatus 20 described below. The liquid slurries the dust introduced from the electric dust precipitator 5.

The mixer 14 comprises, for example, a mixing tank and a stirrer for stirring liquid in the mixing tank. The dust slurry formed by the extractor 13, an insolubilizer A and a pH adjusting liquid Y supplied by an insolubilizer supply 16 and a filter aid B supplied by a filter aid supply 17 are added and mixed in the mixer 14 so as to be supplied to the downstream mixer 101.

The insolubilizer A has to be an agent which reacts with at least tetravalent Se (main form: selenious acid $SeO_3^{2-}$) to insolubilize the same. For example, $FeCl_3$ or $Fe_2(SO_4)_3$ may be used. The filter aid B is preferably an agent having a large particle size and thus having a function of aiding a solid-liquid separation. For example, gypsum C produced in the desulfurization apparatus 20 may be used. As for the pH adjusting liquid Y, for example, an aqueous desulfurization solution as acid and an aqueous caustic soda solution such as alkali may be used. The quantity of the pH adjusting liquid Y to be supplied is adjusted so that the pH in the mixer 14 is of a value for enhancing a insolubilization reaction of tetravalent Se expressed by the reaction formulas (2) to (5) below, that is, pH 5 to 9, preferably 6 to 8. A sensor for detecting pH in the mixer 14, and a controller for automatically adjusting pH in the above predetermined range, by controlling the degree of opening of a flow-rate adjustment valve that is disposed in a pH adjusting liquid supply line connected to the mixer 14, in accordance with a value detected by the sensor, may be provided as components of a control system, although they are not shown in the drawings. The insolubilizer supply 16 comprises a silo or a tank storing the insolubilizer A; and a pipe for introducing the insolubilizer A from the silo or the tank into the mixer 14. Also the filter aid supply 17 comprises a silo or a tank storing the filter aid B; and a pipe for introducing the filter aid B from the silo or the tank into the mixer 14.

The mixer 101 comprises, for example, a mixing tank and a stirrer for stirring liquid in the mixing tank wherein the dust slurry deduced from the mixer 14, the foregoing adsorbent X supplied from the adsorbent supply 100 and the pH adjusting liquid Y are added and mixed with stirring, then is supplied to the following separator 15 after a sufficiently long period of time.

The adsorbent supply 100 comprises a silo or a tank in which the adsorbent X is stored and a pipe for introducing the adsorbent X from the silo or the tank into the mixer 101. The quantity of the pH adjusting liquid Y to be added is adjusted so that pH in the mixer 101 is of a value for enhancing adsorption of hexavalent Se by the absorbent X, that is, about a pH of 2 to 8, preferably a pH of 4 to 6.

The separator 15 comprises, for example, a centrifugal separator whereby only the filtrate is returned to an absorbent slurry tank 35 of the desulfurization apparatus 20.

The desulfurization apparatus 20 is an in-situ oxidation type desulfurization apparatus in this example and comprises an absorption tower 21 having a tank 22 disposed in the bottom thereof to which the absorbent slurry (in this case, composed of limestone) is supplied; a circulating pump 23 for supplying the absorbent slurry in the tank 22 to an upper part 21a (a flue gas introducing portion) of the absorption tower 21 so as to bring the absorbent slurry into contact with the flue gas; an arm-rotation-type air sparger 24 supported in the tank 22, arranged to be horizontally rotated by a motor (not shown) to stir the slurry in the tank 22 and to efficiently blow in supplied air into the tank 22 as small air bubbles; and an air supply pipe 25 for supplying air into the air sparger 24. Thus, the absorbent slurry, which has absorbed sulfur dioxide, and air are efficiently brought into contact with each other for full oxidation to yield gypsum.

A slurry pump 31 for sucking the slurry from the tank 22 is connected to the tank 22. The slurry sucked by the slurry pump 31 is initially introduced into the mixer 14 where the insolubilizer A is added by the insolubilizer supply 16, and then introduced into the mixer 101 where the adsorbent X is added by the adsorbent supply 100. Note that the pH adjusting liquid Y may be added in the mixer 14 and 101, if necessary. Then, the slurry is supplied to a solid-liquid separator 32 for filtration so that solid components including gypsum C in the slurry are taken out as a cake-like solid (usually containing water by about 10%). On the other hand, the filtrate (composed mainly of water) from the solid-liquid separator 32 is once supplied to the filtrate tank 33 where supplementary water D is added, if necessary. Then, a portion of the filtrate is supplied to the absorbent slurry tank 35 by the pump 34, where it is mixed with limestone F ($CaCO_3$) supplied from a limestone silo (not shown), and then again supplied to the tank 22 by a slurry pump 36.

The desulfurization apparatus 20 is provided with an oxidation-reduction reaction controller 40 for controlling the oxidation and reduction in the absorption tower 21. The oxidation-reduction reaction controller 40 according to this example comprises a sensor 41 provided for at the delivery side of the circulating pump 23 so as to detect the oxidation and reduction potential in the tank 22; a flow-rate control valve 42 disposed at an intermediate position in the air supply pipe 25 so as to adjust the quantity of air to be supplied to the air sparger 24; and a controller 43 for controlling the operation of the flow-rate control valve 42 in accordance with an output from the sensor 41. The sensor 41 is set by immersing an electrode made of, for example, platinum into the slurry. The controller 43 continuously controls the degree of opening of the flow-rate control valve 42 so that the quantity of air to be supplied to the air sparger 24 is of a minimum quantity required for consumption of sulfur dioxide by oxidation that is dissolved in the slurry from the flue gas. Specifically, when the concentration of sulfur dioxide is substantially zero, an oxidation-reduction potential is used as a reference potential in accordance with the correlation between the concentration of the sulfur dioxide and the oxidation-reduction potential. Then, the following proportional control is carried out. If the oxidation-reduction potential detected by the sensor 41 is lower than the reference potential, the quantity of air to be supplied is enlarged proportionally to the deviation. If the oxidation-reduction potential detected by the sensor 41 is higher than the reference potential, the quantity of air to be supplied is reduced proportionally to the deviation. As described above, proportional control is performed.

Since oxidation-reduction reaction controller 40 supplies minimum air required for oxidizing the sulfur dioxide completely, hexavalent Se produced by an oxidation of tetravalent Se in the slurry is restrained. Moreover, hexavalent Se in the slurry is substantially reduced by the sulfur dioxide.

That is, if hexavalent Se or tetravalent Se is slightly contained in the slurry that is supplied from the absorbent slurry tank 35 to the tank 22 because it is left in the filtrate from the separator 15, or if hexavalent Se or tetravalent Se is dissolved into the slurry in the absorption tower 21 because it is left in the flue gas that is introduced from the electric dust precipitator 5 into the absorption tower 21, oxidation of tetravalent Se into hexavalent Se is restrained. Moreover, in the absorption tower 21, hexavalent Se is reduced by the sulfur dioxide that is absorbed from the flue gas to yield tetravalent Se. The foregoing reaction is expressed by the following reaction formula (1):

$$SeO_4^{2-}+SO_3^{2-}\rightarrow SeO_3^{2-}+SO_4^{2-} \quad (1)$$

The drain treatment apparatus 50 whereby drain W1 out of the desulfurization apparatus 20, which is a portion of liquid in the filtrate tank 33, delivered by the pump 34, becomes harmless, thus making a disposal process such as discharge possible. If impurities, such as chlorine dissolved from the flue gas are excessively accumulated in the circulating liquid constituting the absorbent slurry, the desulfurizing performance of the desulfurization apparatus 20 and the quality of the gypsum deteriorate. Therefore, a portion of circulating liquid must be, as with drain W1, discharged outside of the system.

The drain treatment apparatus 50 is provided with known facilities (not shown) for performing a so-called advanced process including COD (chemical oxygen demand) treatment, fluorine treatment and nitrogen treatment. This example is characterized by an apparatus for performing a Se treatment as a pre-treatment for the advanced process.

That is, drain W1 is initially supplied to the mixer 14 where the insolubilizer A is added by the insolubilizer supply 16, and then supplied to the mixer 101 where the adsorbent X is added from the adsorbent supply 100. Note that the mixer 14 and 101 are supplied with the pH adjusting liquid Y, if necessary. Then, the slurry is supplied to the solid-liquid separator 15, filtered, and then filtrate W2 is supplied to the advanced process facility.

Figure 6:
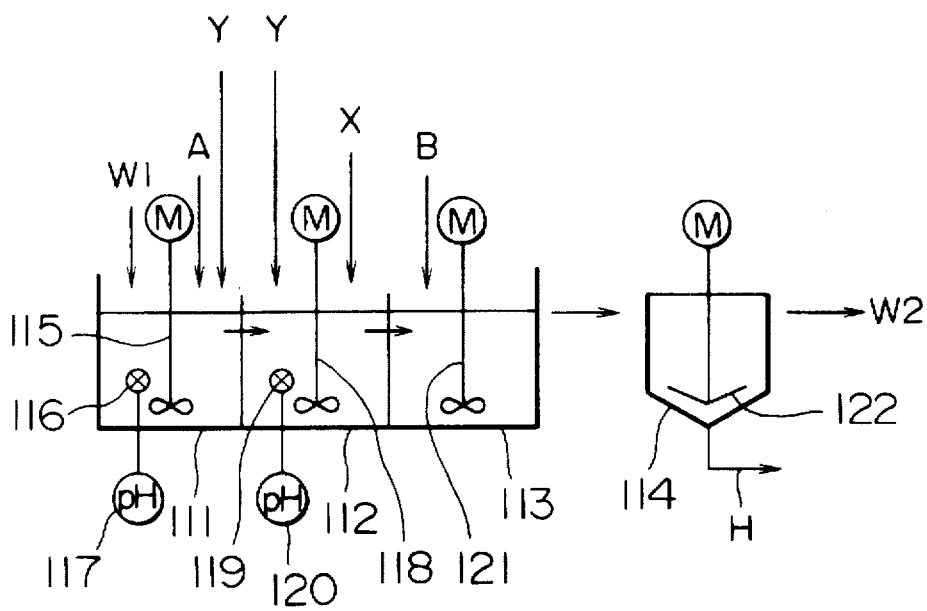
FIG. 6 is a drawing showing a characteristic part of an example of the drain treatment apparatus according to the present invention.

FIG. 6 is a drawing showing a more specific construction example of the Se treatment facility as for the drain treatment apparatus 50. It is described hereinafter. The foregoing apparatus mainly comprises an insolubilizing treatment tank 111, an adsorbing treatment tank 112, a agglomeration tank 113 (solid-liquid separator) and a thickener 114 (solid-liquid separator). The insolubilizing treatment tank 111 corresponds to the mixer 14 shown in FIG. 1, the adsorbing treatment tank 112 corresponds to the mixer 101 and the agglomeration tank 113 and the thickener 114 correspond to the solid-liquid separator 15.

The insolubilizing treatment tank 111 is successively supplied with non-treated drain W1, insolubilizer A (for example, $FeCl_3$ or $Fe_2(SO_4)_3$) and the pH adjusting liquid Y which are then mixed by a stirrer 115.

The tank 22 is provided with a pH sensor 116 for detecting pH of the processing liquid in the tank 22 and a pH controller 117 for controlling the quantity of the pH adjusting liquid Y to be added into the tank 22 in accordance with the value detected by the pH sensor 116 in order to maintain the pH in the tank at the predetermined range with which the reaction for insolubilizing tetravalent Se is promoted.

The adsorbing treatment tank 112 wherein the drain is sufficiently mixed by stirring with the insolubilizer A for insolubilizing tetravalent Se, is continuously supplied from the insolubilization treatment tank 111. The adsorbent X (in the form of solid, powder or liquid) and the pH adjusting liquid Y are successively introduced into the foregoing tank 112 so as to be mixed by stirrer 118. The tank 112 comprises a pH sensor 119 for detecting pH of the treated liquid in the tank and a pH controller 120 for controlling the quantity of the pH adjusting liquid Y to be introduced into the tank in accordance with the value detected by the pH sensor 119 in order to maintain pH of the treated liquid in the tank at the foregoing predetermined range with which adsorption of hexavalent Se is enhanced.

In the agglomeration tank 113, the drain that is sufficiently mixed by stirring with the treatment agent A and the adsorbent X is continuously supplied from the adsorbing treatment tank 112. Moreover, polymer flocculant B is continuously added there and mixed by a stirrer 121. Note that the polymer flocculant B is added to connect fine particles of the solid components by a so-called crosslinking phenomenon so that the particles are easily sedimented and separated in the thickener 114 to be described hereafter.

The thickener 114 according to this example is a known apparatus having a rake 122 for collecting sludge wherein sludge S (solid components) in the drain deduced from the agglomeration tank 113 is concentrated and discharged from the central portion of the bottom thereof while purified liquid (that is, treated drain W2) is discharged by overflow from the upper portion thereof.

In the flue gas treatment system having the foregoing construction, a process for removing dust in the flue gas and a process for treating Se contained in the dust in a large quantity are initially performed as described below.

That is, dust (ash) removed by the electric dust precipitator 5 and the like is extracted by the extractor 13 with the liquid supplied from the filtrate tank 33 of the desulfurization apparatus 20 to yield slurry. Then, the insolubilizer A and the filter aid B are added in the mixer 14, and if necessary, a pH adjuster is added.

At this time, in the mixer 14, tetravalent Se (main form: selenious acid $SeO_3^{2-}$) that is contained in the slurry (hereinafter called "dust slurry") produced by the extractor 13 reacts with the insolubilizer A ($FeCl_3$ or $Fe_2(SO_4)_3$) as shown by the following reaction formulas (2) and (3) or (4) and (5), and is converted into insoluble ferric selenite ($Fe_2(SeO_3)_3$).

$$FeCl_3 \rightarrow Fe^{3+}+3Cl^- \quad (2)$$

$$2Fe^{3+}+3SeO_3^{2-} \rightarrow Fe_2(SeO_3)_3 \quad (3)$$

or

$$Fe_2(SO_4)_3 \rightarrow 2Fe^{3+}+3SO_4^{2-} \quad (4)$$

$$2Fe^{3+}+3SeO_3^{2-} \rightarrow Fe_2(SeO_3)_3 \quad (5)$$

Then, the dust slurry is introduced into the mixer 101, and then the adsorbent X and, if necessary, the pH adjusting liquid Y are added from the adsorbent supply 100, and then mixed by stirring. After a sufficiently long period of time, the mixture is supplied to the downstream separator 15.

When the dust slurry is separated by the separator 15 into solid and liquid, the dust cake G, being the solid containing most of hexavalent Se and tetravalent Se in the drain can be discharged because it is in a form harmless to the environment.

That is, almost all of the hexavalent Se is adsorbed by the adsorbent and thus separated as a solid component together with the adsorbent X. Even when a liquidized adsorbent is used, the liquidized organism material is linked with the hexavalent Se and thus precipitated to the solid phase side. Therefore, most of the hexavalent Se is contained by the dust cake G and discharged. Since the hexavalent Se adsorbed to the adsorbent X is not easily desorbed in the natural environment, and since tetravalent Se also exists in the form of insoluble ferric selenite as the result of the above reaction, the dust cake G may be disposed without any further treatment because the elution regulation for Se can be satisfied. As a result of the effect of the filter aid B that is added in the mixer 14, effective dehydration can be achieved in the separator 15 to yield a low moisture content dust cake G.

Although the filtrate in the separator 15 contains tetravalent and hexavalent Se in a small quantity that is not separated into the solid, the filtrate is supplied together with the absorbent slurry to the absorption tower 21 of the desulfurization apparatus 20 by the slurry pump 36 so that the substantially all quantity is converted to tetravalent Se according to the above reaction (expressed by reaction formula (1)) as described later.

Next, removal of sulfur dioxide contained in the flue gas, by-production of gypsum in the above-mentioned flue gas treatment system, and removal of Se mixed with the slurry in the desulfurization apparatus 20 are described.

That is, the flue gas introduced into the absorption tower 21 is, by the circulating pump 23, brought into contact with the absorbent slurry injected from a header pipe 26 so that sulfur dioxide and Se left in the flue gas are absorbed and removed, and then discharged as treated flue gas through a flue gas discharge port 21b.

The sulfur dioxide absorbed by the absorbent slurry that is injected from the header pipe 26 flows downward through a filler 27, brought into contact with a large number of air bubbles that are blown and stirred by the air sparger 24 for oxidation in the tank 22. Then, a neutralization reaction takes place to yield gypsum. In the absorption tower 21, the foregoing reaction expressed by reaction formula (1) converts substantially the overall quantity of hexavalent Se (main form: selenic acid $SeO_4^{2-}$) into tetravalent Se (main form: selenious acid $SeO_3^{2-}$). Moreover, the oxidation of tetravalent Se into hexavalent Se is restrained. It should be noted that main reactions (those except the foregoing reaction formula (1)) are expressed by the following reaction formulas (6) to (8):

(Introduction of flue gas into absorption tower)

$$SO_2 + H_2O \rightarrow H^+ + HSO_3^- \quad (6)$$

(Tank)

$$H^+ + HSO_3^- + \tfrac{1}{2}O_2 \rightarrow 2H^+ + SO_4^{2-} \quad (7)$$

$$2H^+ + SO_4^{2-} + CaCO_3 + H_2O \rightarrow CaSO_4 \cdot 2H_2O + CO_2 \quad (8)$$

Thus, gypsum ($CaSO_4 \cdot 2H_2O$), a small quantity of absorbent limestone ($CaCO_3$), tetravalent Se and a small quantity of hexavalent Se which has not been reduced are suspended in the tank 22, and then the suspension is sucked by the slurry pump 31. Then, the insolubilizer A or the adsorbent X is added in the mixer 14 or the mixer 101, and further, if necessary, the pH adjusting liquid is supplied for mixing. Then, the mixture is supplied to the solid-liquid separator 32, filtered, and taken out as gypsum cake C (usual water content: about 10%) containing a small quantity of water. Therefore, after the slurry withdrawn from the tank 22 is separated into solid and liquid by the solid-liquid separator 32, most of both the hexavalent Se and the tetravalent Se in the slurry becomes harmless and contained in the gypsum C as solid components to be discharged. Since Se is contained in a small quantity, the quality of the gypsum C does not deteriorate.

Since the concentration of the hexavalent Se in the slurry sucked by the slurry pump 31 is extremely low because of the foregoing oxidation-reduction reaction controller 40, only a small capacity is required for adsorbent supply 100 and a mixer 101 of the slurry withdrawal line. Moreover, the quantity of the adsorbent X to be added can be reduced.

Next, a function of the drain treatment apparatus 50 in the above flue gas treatment system is explained.

In the system of this example, almost all of the Se removed from the flue gas is, after treatment, transferred mainly into dusk cake G or gypsum C for disposal or reclamation as described above. When the water separated from the solid-liquid separator 32 contains a small amount of remaining Se, a portion of the water is discharged together with the drain W1. In this example, however, even if Se contained in the drain W1 is extremely small, almost all of the Se is removed at the Se treatment installation of the drain treatment apparatus 50.

That is, in the drain treatment apparatus 50, the introduced drain W1 is, in the mixer 14 or the mixer 101, supplied with the insolubilizer A or the adsorbent X, and, if necessary, the pH adjusting liquid is supplied for mixing. Thereafter, the mixture is supplied to the solid-liquid separator 102 and filtered. Accordingly, almost all of the Se is transferred to the sludge S and discharged. Thus, the concentration of Se in the drain W2 to be supplied to the advanced treatment facility can significantly be lowered.

As described above, the flue gas treatment system according to Example 1 can not only perform the conventional purification (removal of dust and sulfur dioxide) of flue gas and but also remove Se from the flue gas into dust cake G, gypsum C or the sluge H for diposal after converting the removed Se to an insoluble form.

Since a portion of the circulating liquid in the desulfurization apparatus 20 is used as the solvent for extracting the dust precipitated by the electric dust precipitator 5, the water quantity for use (the quantity for circulation) and for consumption can be reduced as compared with the construction in which water or the like is individually supplied to the extractor 13. Thus, the operation cost of the system can be also reduced, and the capacity of the drain treatment apparatus 50 is reduced. As a result, the cost of the facility can be reduced.

Since the filter aid B is supplied to the mixer 14, a high dehydration can be achieved by the separator 15. Therefore, the dust cake G contains such a small amount of water that it can be handled easily, for example, when transported.

<EXAMPLE 2>

Next, Example 2 which is an embodiment of the present invention described in (4) is explained. Note that similar components to those according to Example 1 are given the same reference numerals without explanation.

Figure 2:
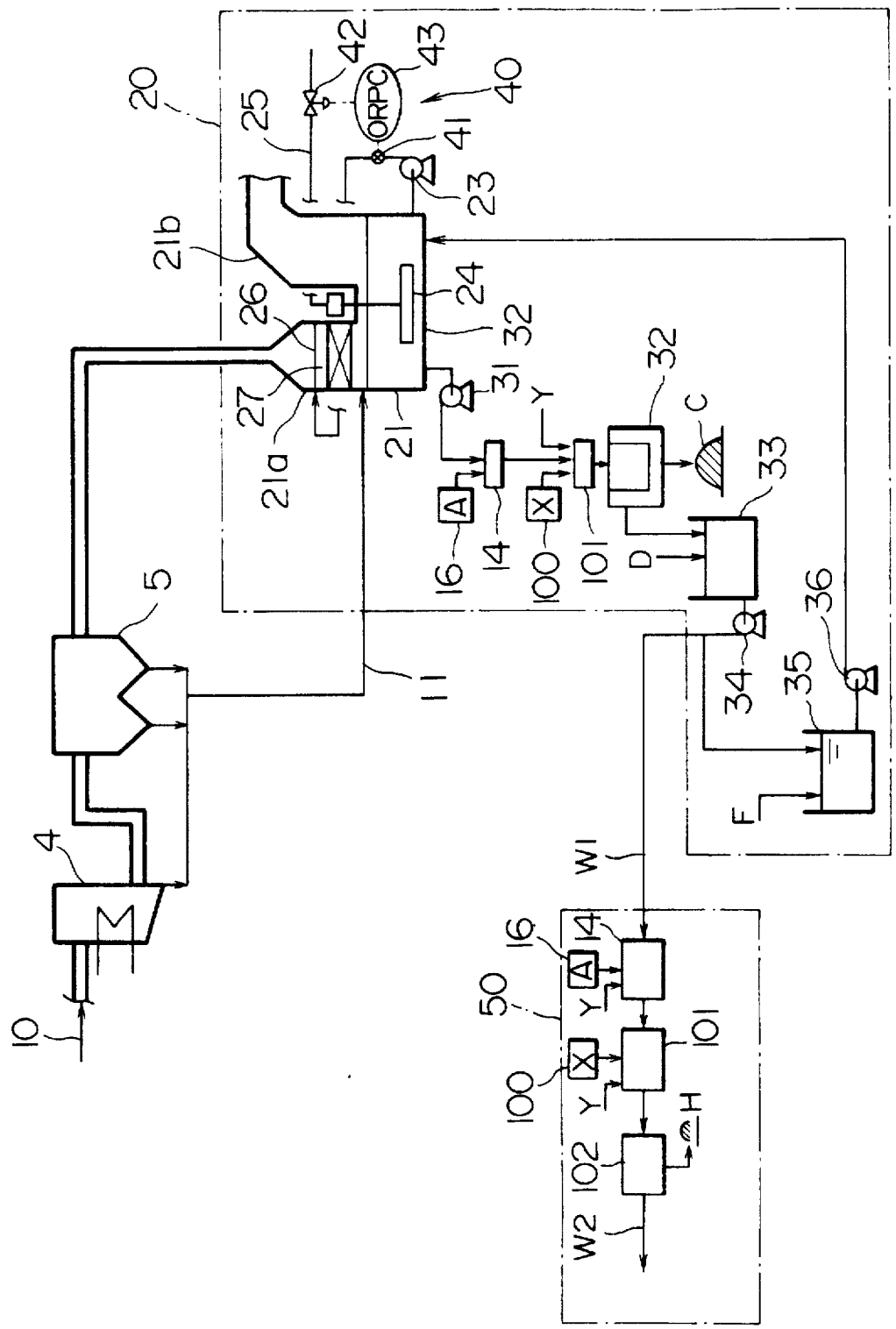
FIG. 2 is a drawing showing the construction of the flue gas treatment system according to Example 2 of the present invention.

FIG. 2 is a drawing showing the construction of a flue gas treatment system according to Example 2. The flue gas treatment system according to this example is characterized by an introduction line 11 (dust introducer) for directly introducing dust precipitated by the electric dust precipitator 5 into the absorption tower 21 of the desulfurization apparatus 20.

In this case, almost all of the Se in the flue gas is introduced into the absorption tower 21, where almost all of the hexavalent Se is converted into tetravalent Se. The Se is made insoluble by the insolubilizer A, or adsorbed by the adsorbent X so that it is transferred to the gypsum C or to the sludge H in the drain treatment apparatus 50. In this example, the absorption tower 21 serves as the extractor 13 of Example 1, while the solid-liquid separator 32 acts as the separator 15 of Example 1. Therefore, the extractor 13 and the separator 15 of Example 1 can be omitted. Thus, the facility cost can be further reduced.

Although the cost can be further reduced as compared with Example 1 or the like, there arises a risk that a satisfactory desulfurization and high quality of the gypsum C cannot be obtained easily owning to the influence of the dust (impurities) that have entered the absorption tower in large quantity. If this risk becomes an actual problem, it is preferable that the construction of Example 1 or of Example 4 or 5 explained below be used. From the point of view of solving this problem, the construction of Example 1 or the like is especially suited.

The addition of the insolubilizer A or the adsorbent X may be carried out at a position other than the point shown in FIG. 2, if it is done in the slurry apparatus 20. The addition may also be done directly into the absorption tower 21.

<EXAMPLE 3>

Next, Example 3 which is an embodiment of the present invention described in (5) is explained. Note that similar components to those of Example 1 are given the same reference numerals without explanation.

Figure 3:
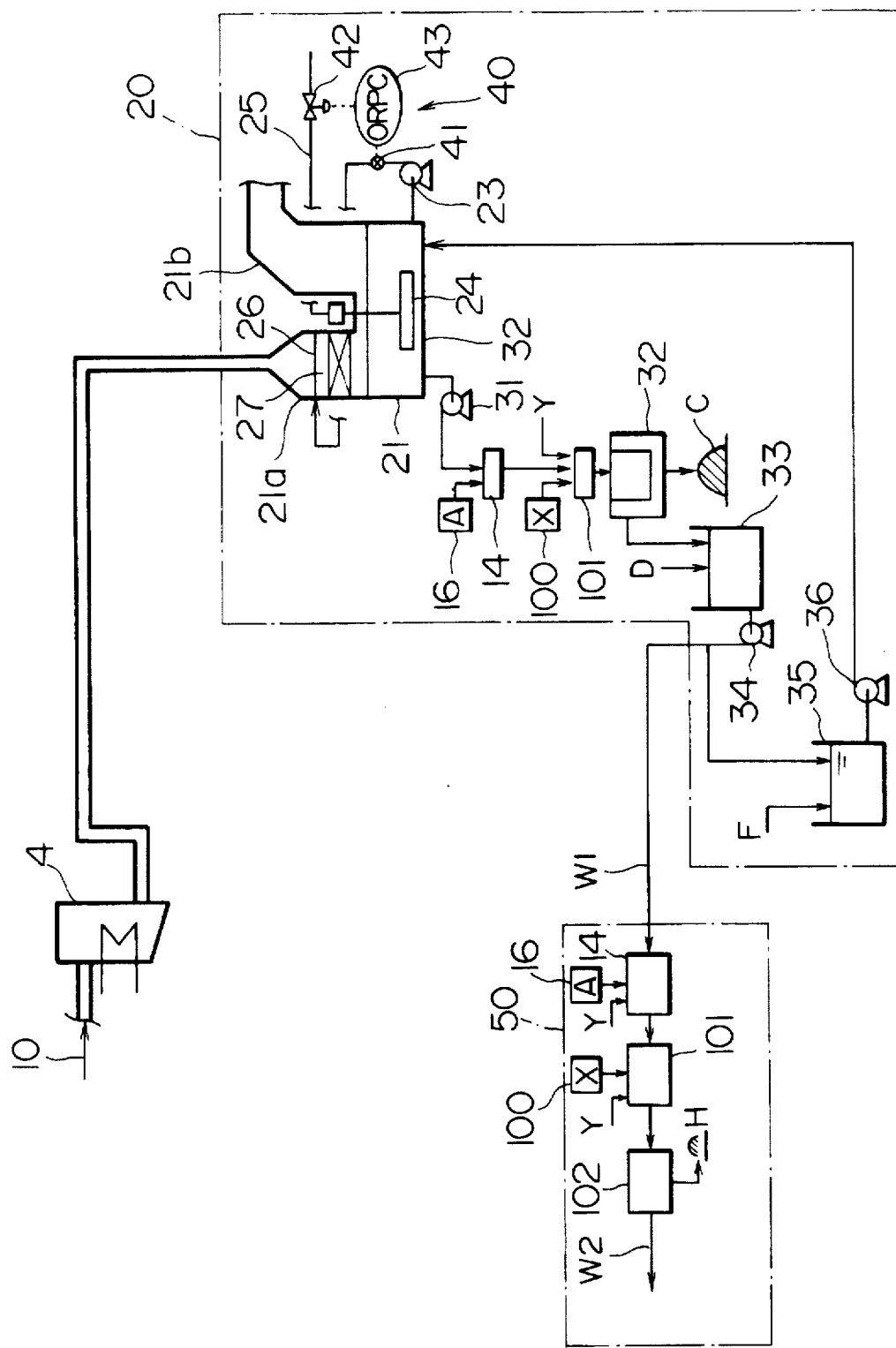
FIG. 3 is a drawing showing the construction of the flue gas treatment system according to Example 3 of the present invention.

FIG. 3 is a drawing showing a flue gas treatment system of Example 3. The flue gas treatment system according to this example is characterized in that the electric dust precipitator 5 is omitted and the flue gas is directly introduced together with fly ash into the absorption tower 21 of the desulfurization apparatus 20.

In this case, almost all of the Se in the flue gas is introduced into the absorption tower 21, where almost all of the hexavalent Se is converted into tetravalent Se. Thereafter, Se is converted to an insoluble form by the insolubilizer A or adsorbed by the adsorbent X so that it is transferred into gypsum C or the sludge H of the drain treatment apparatus 50. In this case, the absorption tower 21 serves as the electric dust precipitator 5 and the extractor 13 of Example 1, while the solid-liquid separator 32 serves as the separator 15 of Example 1. Accordingly, the electric dust precipitator 5, the extractor 13, and the separator 15 of the system of Example 1 can be omitted and therefore the cost of the facility can further be reduced.

Although the cost can further be reduced as compared with Example 1 or the like, there may be a risk that a satisfactory desulfurization and high quality of gypsum C cannot be achieved owning to the influence of the dust (impurities) that have entered the absorption tower in a large quantity. If the risk becomes an actual problem, it is preferable that the construction of Example 1 or of Example 4 or 5 explained below is used. From the point of view of solving the problem, the construction of Example 1 is especially suited.

<EXAMPLE 4>

Next, Example 4 which is an embodiment of the present invention described in (6) is explained. Note that similar components to those of Example 1 are given the same reference numerals without explanation.

Figure 4:
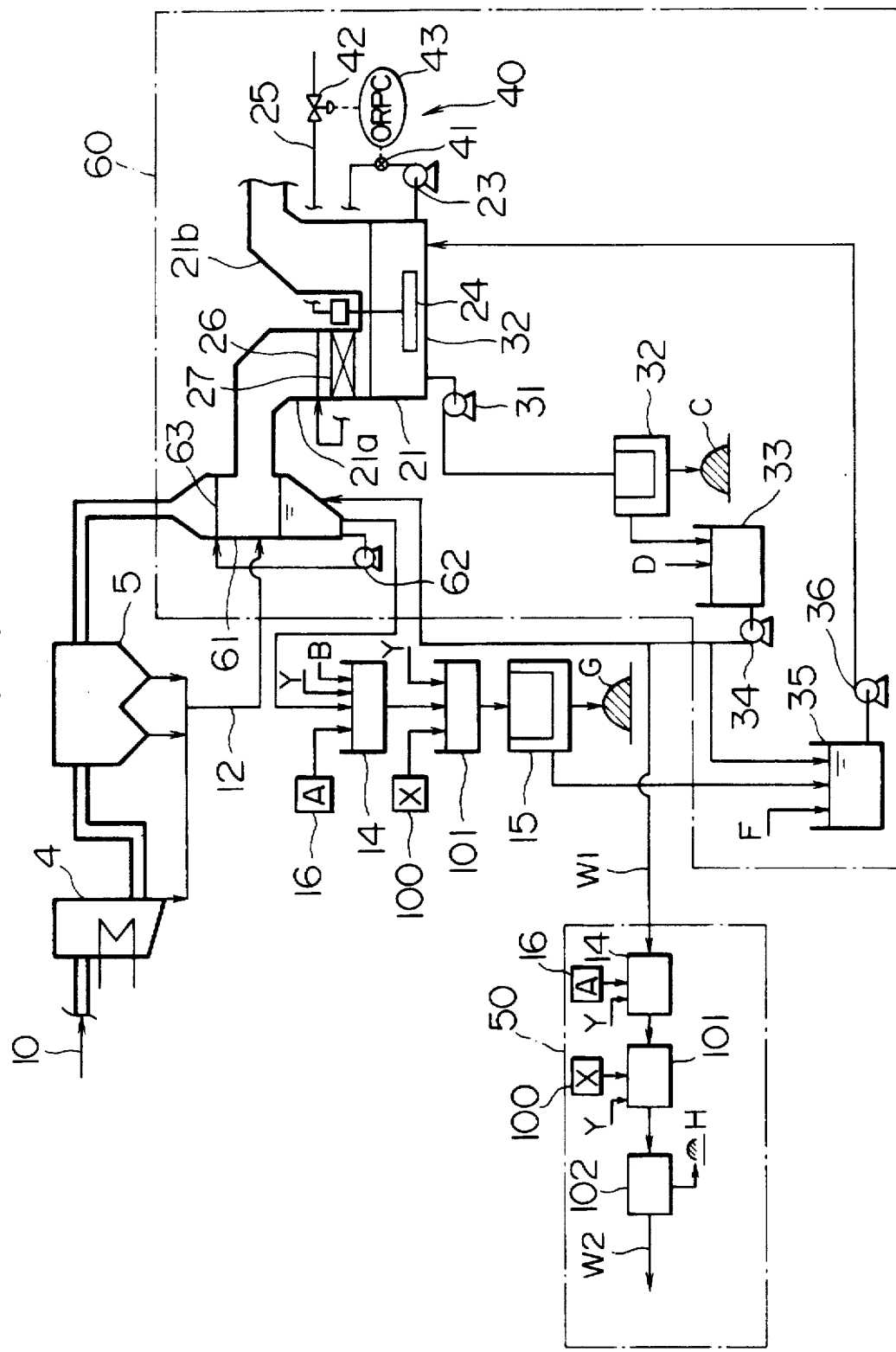
FIG. 4 is a drawing showing the construction of the flue gas treatment system according to Example 4 of the present invention.

FIG. 4 is a drawing showing a flue gas treatment system of Example 4. The flue gas treatment system of this example is characterized by a construction wherein a desulfurization apparatus 60 having a cooling and dust removal tower 61 for cooling flue gas and removing dust from the flue gas is disposed upstream of the absorption tower 21, and the dust precipitated by the electric dust precipitator 5 is directly introduced into the cooling and dust removal tower 61 of the desulfurization apparatus 60 through an introduction line 12 (dust introducer), and the insolubilizer A or the adsorbent X is added in the mixer 14 or the mixer 101, to the slurry withdrawn from the cooling and dust removal tower 61, and then solid-liquid separation is performed by the separator 15.

The cooling and dust removal tower 61 is supplied with the liquid from the filtrate tank 33 by the pump 34, the liquid being injected from a header pipe 63 at the upper part by a circulating pump 62. It should be noted that a mist eliminator (not shown) is disposed between the cooling and dust removal tower 61 and the absorption tower 21.

In this case, almost all of Se in the flue gas is once introduced into the cooling and dust removal tower 61, where the foregoing reaction (reaction formula (1)) takes place so that almost all of the hexavalent Se is converted into tetravalent Se. Thereafter, Se is converted to an insoluble form by the insolubilizer A or adsorbed by the adsorbent X so that it is transferred into dust cake G or the sludge H. In this case, the absorption tower 61 serves as the extractor 13 of Example 1. Thus, the extractor 13 of the system of Example 1 can be omitted, further reducing the cost of the facility.

Moreover, the construction according to this example can prevent a large quantity of dust from entering the absorption tower 21 as compared with Examples 2 and 3. Therefore, the cost of the facility can be even further reduced, along with the achievement of a satisfactory desulfurization and high quality gypsum C.

The insolubilizer A, the adsorbent X, or the like may directly be added into the cooling and dust removal tower 61.

Moreover, the slurry withdrawal line (upstream of the solid-liquid separator 32) of the desulfurization apparatus 20 may be provided with a similar Se treatment construction (the mixer 14, the insolubilizer supply 16, the mixer 101 and the adsorbent supply 100) to further remove Se.

<EXAMPLE 5>

Next, Example 5 which is an embodiment of the present invention described in (7) is explained. Note that similar components to those of Example 4 are given the same reference numerals without explanation.

Figure 5:
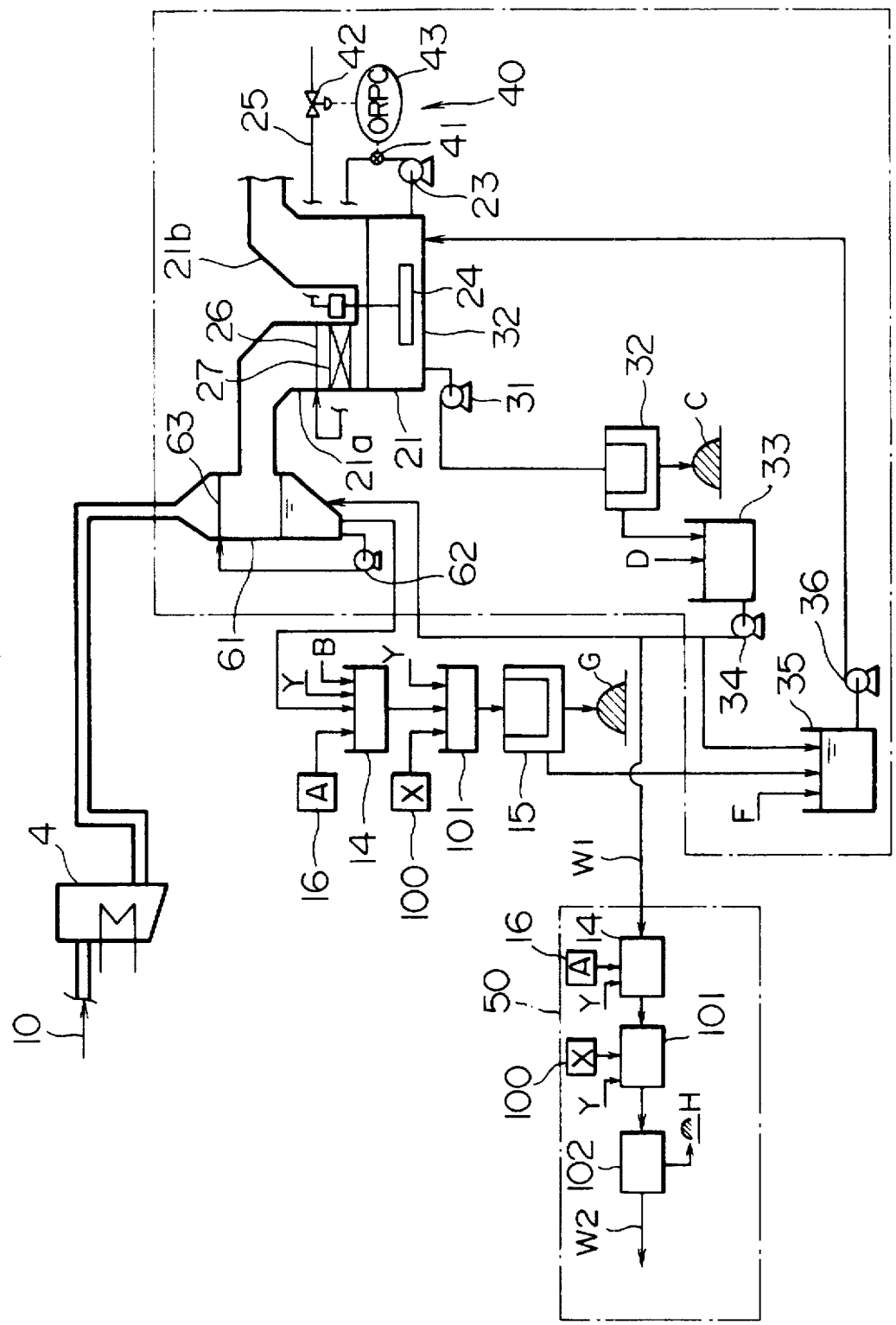
FIG. 5 is a drawing showing the construction of the flue gas treatment system according to Example 5 of the present invention.

FIG. 5 is a drawing showing the construction of a flue gas treatment system according to Example 5. The flue gas treatment system of this example is characterized in that the desulfurization apparatus 60 having the cooling and dust removal tower 61 for cooling flue gas and removing dust is disposed upstream of the absorption tower 21; the flue gas from which dust has not been removed is directly introduced into the cooling and dust removal tower 61 of the desulfurization apparatus 60; the insolubilizer A or the adsorbent X is added in the mixer 14 or the mixer 101 to the slurry withdrawn from the cooling and dust removal tower 61; and then separator 15 performs solid-liquid separation.

In this case, almost all of the Se in the flue gas is introduced into the cooling and dust removal tower 61, where the foregoing reaction (reaction formula (1)) takes place so that almost all of the hexavalent Se is converted into tetravalent Se. Thereafter, tetravalent Se is made to be insoluble by the insolubilizer A or adsorbed by the adsorbent X so that it is transferred into dust cake G or the sludge H. In this case, the absorption tower 61 serves as the electric dust precipitator 5 and the extractor 13 of Example 1. Thus, the electric dust precipitator 5 and the extractor 13 of the system of Example 1 can be omitted, while further reducing the cost of the facility.

Moreover, the construction of this example can prevent a large quantity of dust from entering the absorption tower 21 as compared with Examples 2 and 3. Accordingly, the facility cost can further be reduced and a satisfactory desulfurization and high quality gypsum C can be obtained.

Moreover, the slurry withdrawal line (upstream of the solid-liquid separator 32) of the desulfurization apparatus 20 may be provided with a similar Se treatment construction (the mixer 14, the insolubilizer supply 16, the mixer 101 and the adsorbent supply 100) to further remove Se.

Next, other embodiments of the drain treatment apparatus are explained with reference to FIGS. 7 and 8.

Figure 7:
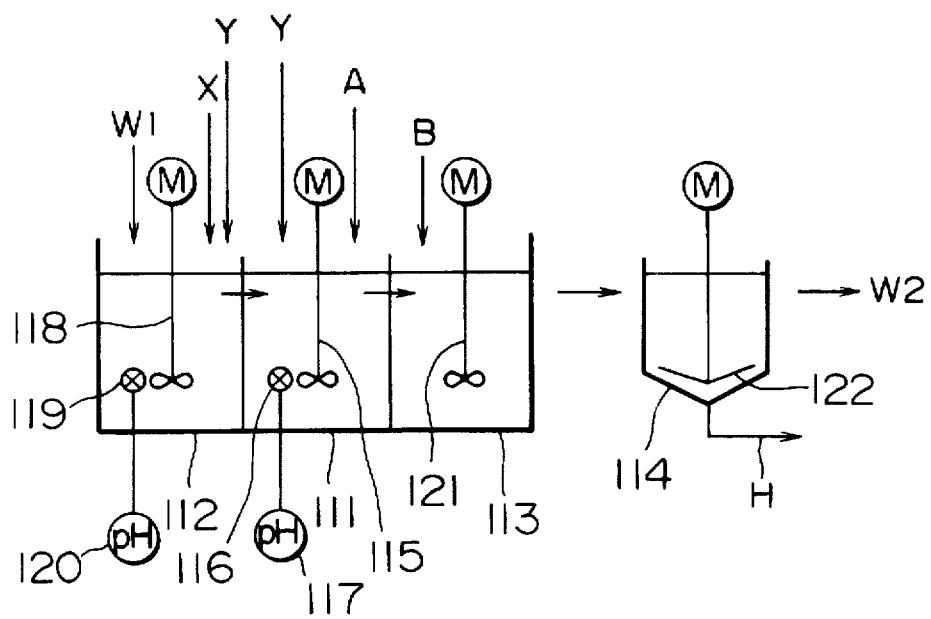
FIG. 7 is a drawing showing a characteristic part of another example of the drain treatment apparatus according to the present invention.

The drain treatment apparatus having a characteristic part as shown in FIG. 7 is different from the drain treatment apparatus in FIG. 6 in that the positions of the insolubilizing treatment tank 111 and the adsorbing treatment tank 112 are interchanged. Since the reaction for converting tetravalent Se to an insoluble form by the insolubilizer A and the reaction for adsorbing hexavalent Se by the adsorbent X may be carried out in the reverse order, all of the tetravalent Se and hexavalent Se can be removed efficiently, which is similar to the drain treatment system in FIG. 6, thus being converted to a harmless form for disposal.

Figure 8:
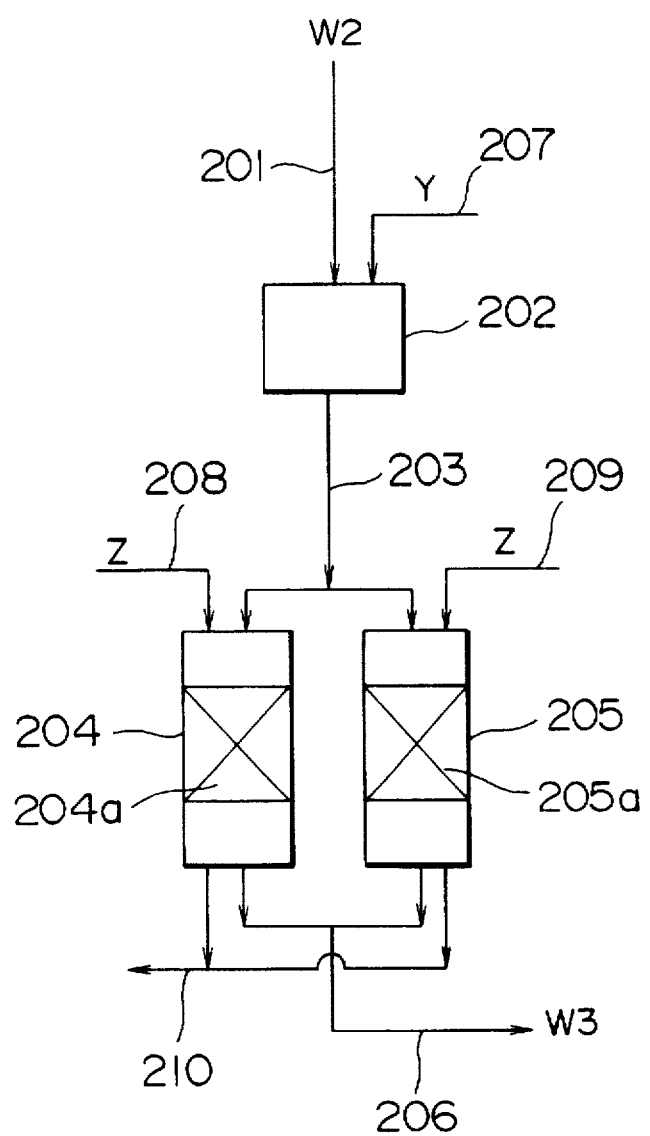
FIG. 8 is a drawing showing a characteristic part of the other example of the drain treatment apparatus according to the present invention.

The drain treatment apparatus having the characteristic parts shown in FIG. 8 is constructed so that it is of the drain treatment apparatus construction shown in FIG. 6, except that it has a fixed-floor-type facility for adsorbing hexavalent Se as shown in FIG. 8 disposed downstream of the thickener 114 in the adsorbing treatment tank 112.

This absorbing treatment facility comprises a pH adjustment tank 202 to which drain W2 (supernatant liquid in the thickener 114) containing hexavalent Se is introduced through a drain introduction line 201; packed towers 204 and 205 into which the pH-adjusted drain deduced from the pH adjustment tank 202 is introduced through a pH-adjusted drain line 203; a treated drain discharging line 206 for discharging treated drain W3 from the packed towers 204 and 205; a pH-adjusted liquid supply line 207 for supplying pH adjusting liquid Y to the pH adjustment tank 202; reproduction liquid supply lines 208 and 209 for supplying reproduction liquid Z to the packed tower 204 and 205; and a reproduction liquid discharging line 210 for discharging reproduction liquid from the packed towers 204 and 205.

Although not shown in the drawings, as being components of the control system, a sensor for detecting pH in the pH adjustment tank 202, and a controller for controlling the degree of opening of a flow-rate adjustment valve which is provided in the pH adjusting liquid supply line 207 in order to maintain pH in the pH adjustment tank 2 at the above predetermined range with which the adsorption is enhanced, may be provided. Furthermore, a controller may be provided which automatically controls to which packed tower 204 or 205 the reproduction liquid is supplied, by regulating opening/closing valves or flow-passage switch valves which are placed in each of the lines 203, 206, 208, 209 and 210 to The packed towers 204 and 205 are fixed-floor-type contact treatment towers filled with fillers 204a and 205a containing the adsorbent X composed of the foregoing solid organism material.

As the pH adjusting liquid Y, for example, an aqueous sulfuric acid ($H_2SO_4$) solution may be used as the acid and an aqueous caustic soda (NaOH) solution may be used as the alkali. It is preferable that two types of the pH adjusting liquid supply lines 207 are provided, that is, an acid line and an alkali line. The pH in the pH adjustment tank 202 is controlled to be about 2 to 8, preferably 4 to 6. As being the reproduction liquid Z, 1 to 2N aqueous hydrochloric acid solution may be used.

In the drain treatment apparatus shown in FIG. 8, the pH of drain W2 is adjusted in the pH adjustment tank 202, and then drain W2 is introduced into at least either of the packed tower 204 or the packed tower 205 in which hexavalent Se is adsorbed and removed, and then discharged from the treated drain discharging line 206. The packed tower 204 or the packed tower 205 is suitably supplied with the reproduction liquid Z so that Se adsorbed in the adsorbent X of fillers 204 and 205a is eluted into the reproduction liquid. The reproducing liquid containing desorbed Se is discharged from the reproduction liquid discharge line 210.

The present invention is not limited to the foregoing embodiments and a variety of modes are permitted. For example, the construction of the desulfurization apparatus is not limited to the in-situ oxidation type apparatus shown in the foregoing examples. For example, another construction may be used in which an oxidizing tower, to which slurry withdrawn from the absorption tower is introduced, is individually provided, and air is blown into the oxidizing tower to perform the final oxidation-reduction reactions. Also in this case, hexavalent Se is converted into tetravalent Se in the absorption tower or the oxidation tower.

The extractor and the mixer are not always required to be individual tanks. For example, a construction may, of course, be used wherein extraction of dust and mixing of insolubilizer are performed in a single tank (that is, the extractor and the mixer according to the present invention can be formed by a single tank).

As for Examples 1 to 3, the construction (the mixer 14, the insolubilizer supply 16, the mixer 101 and the adsorbent supply 100) which is provided for the slurry withdrawal line (upstream of the solid-liquid separator 32) may be omitted so that the insolubilizer A and others can be added at one place in the drain treatment apparatus 50. Since the slurry liquid in the absorption tower and the cooling and dust removal tower of the desulfurization apparatus is treated by the drain treatment apparatus 50 at the end, the overall Se removal treatment may be performed even if the insolubilizer A or the like is supplied to only the drain treatment apparatus.

Water separated by the separator 15 may be directly introduced into the drain treatment apparatus 50 in Example 1 or the like.

As for the drain treatment apparatus, a so-called drain-free treatment apparatus may be used. That is, the circulating liquid discharged from the desulfurization apparatus, after having Se and other impurities removed, returns again to the desulfurization apparatus (for example, the absorbent slurry tank 35) without generating drain.

[Experiments]

The inventors of the present invention performed experiments for confirming the adsorbing performance of the foregoing adsorbent X. Next, the experiments are explained.
<Experiment 1>

In Experiment 1, Se removal test was performed by using a chelating agent.

A commercially available chelating agent (chelating forming group: —NH—$CS_2H$, —SH) was added to the drain containing tetravalent Se and hexavalent Se at an amount of 50 mg/l. Then, NaOH was added to adjust the pH to about 7, and the effect of removing tetravalent Se and hexavalent Se was examined. Results are shown in Table 1. Although tetravalent Se could be removed by the chelating agent, hexavalent Se could not substantially be removed. Thus, it is understood that the chelating agent is not effective in removing hexavalent Se.

TABLE 1

| Results of Se Removal Test Using Chelating Agent | | |
|---|---|---|
| Items | Before Test | After Test |
| Concentration of Tetravalent Se in Drain (mg/l) | 1.61 | 0.090 |
| Concentration of Hexavalent Se in Drain (mg/l) | 0.472 | 0.471 |

<Experiment 2>

In Experiment 2, S e removal test using $FeCl_3$ was performed.

$FeCl_3$ was added to the drain containing tetravalent Se and hexavalent Se at the amount of $Fe^{3+}$ being 110 mg/l. Then, NaOH was added to adjust the pH to a bout 7 and the effect of removing tetravalent Se and hexavalent Se was examined. $FeCl_3$ is effective in removing tetravalent Se, but is not substantially effective in removing hexavalent Se.

TABLE 2

Results of Se Removal Test Using $FeCl_3$

| Items | Before Test | After Test |
| --- | --- | --- |
| Concentration of Tetravalent Se in Drain (mg/l) | 1.61 | 0.042 |
| Concentration of Hexavalent Se in Drain (mg/l) | 0.472 | 0.470 |

<Experiment 3>

In Experiment 3, shell membranes, which are organism materials, were used in a removal test by adsorbing tetravalent Se and hexavalent Se in the drain from the desulfurization process. Egg shells were immersed in 5% HCl for eluting calcium ion, which is the metal ion forming the egg shell, to yield shell membranes. Then, the shell membranes were washed with 0.5N NaOH and distilled water to obtain the shell membranes for the test. The obtained shell membranes were used in the removal tests by adsorbing tetravalent Se and hexavalent Se under conditions shown in Table 3. The experiments were carried out as follows. The shell membrane is immersed in the desulfurized drain in a vessel at each pH, with stirring for a predetermined time, and then concentrations of tetravalent Se and hexavalent Se in the liquid are analyzed.

TABLE 3

Conditions for Se Removal Test By Adsorption

| Items | | Conditions |
| --- | --- | --- |
| Initial Concentration of Se in Desulfurized Drain | $Se^{4+}$ | 4.06 mg/l |
| | $Se^{6+}$ | 4.25 mg/l |
| Quantity of Egg Shells | | 0.03 g |
| Quantity of Desulfurized Drain | | 20 ml |
| Temperature | | 25° C. |
| Time | | 3 hr |
| Stirring | | Performed |
| Adjustment of pH | | Adjusted by adding $H_2SO_4$ or NaOH |

Figure 9:
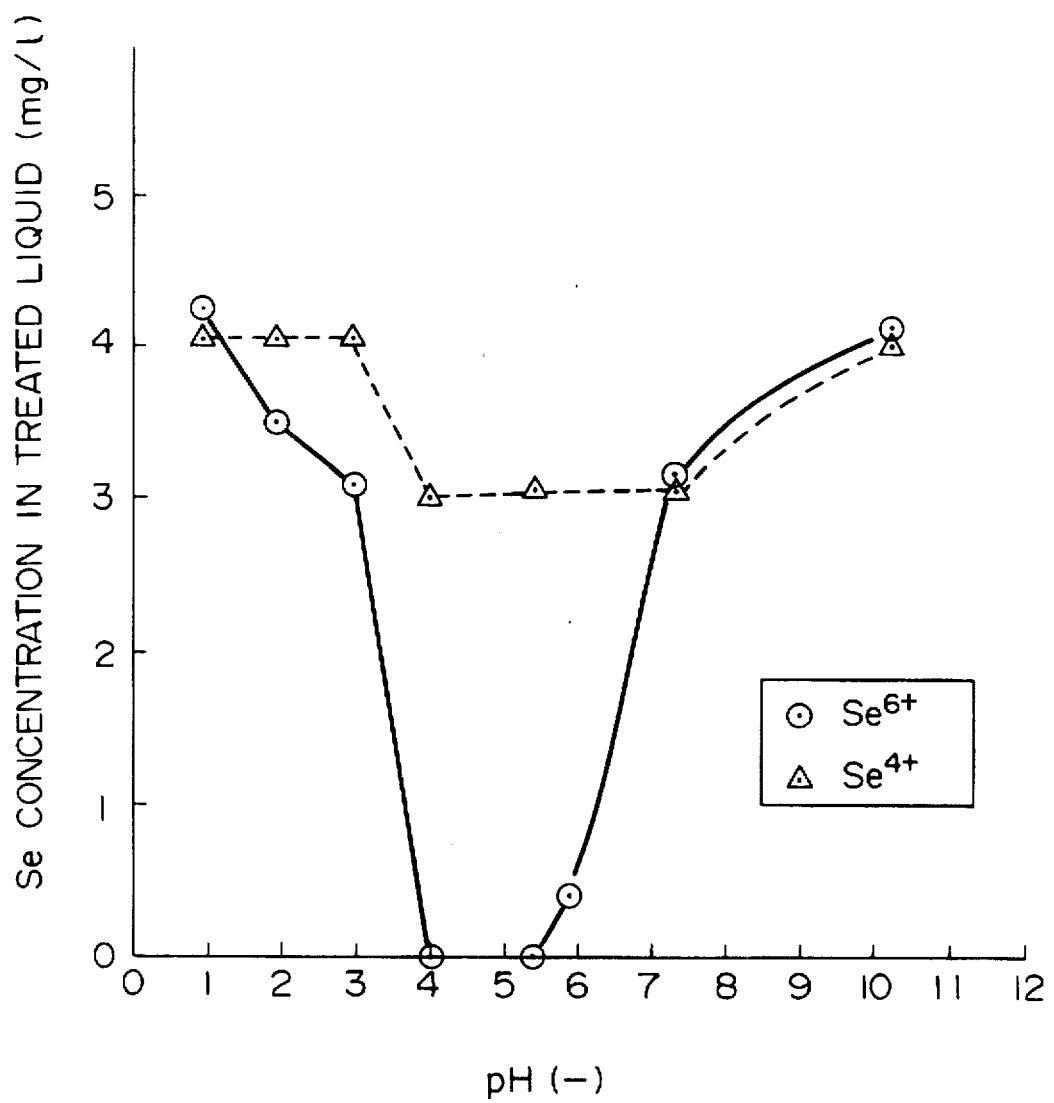
FIG. 9 is a graph showing the result of Experiment 3 for confirming the effect of removing Se according to the present invention.

FIG. 9 is a graph of the test results (the concentration of Se after the treatment at each pH), that is, the influence of pH upon the performance of the shell membrane in adsorbing tetravalent Se and hexavalent Se for their removal is shown. As can be understood from the results, the shell membrane has a characteristic that it can adsorb Se (tetravalent Se and hexavalent Se) for its removal in a pH range from about 2 to 8, preferably 4 to 6. In particular, significant Se removal performance by adsorbing hexavalent Se was obtained. Although hexavalent Se cannot easily be removed by usual chelating agent or $FeCl_3$, selective treatment of hexavalent Se can be achieved by the shell membrane. Since the treatment of tetravalent Se can be easily performed by using $FeCl_3$ or a chelating agent, a combination of the foregoing materials allows the total concentration of Se to be significantly lowered. Consequently, the drain regulation of 0.1 mg/l can be easily satisfied.

<Experiment 4>

In Experiment 4, solid or liquid organism materials such as shell membranes, feathers and wool were used in a flow type reaction tank to perform tests for removing hexavalent Se from the desulfurized drain.

The solid organism material was obtained as follows. Egg shells of fowl were initially immersed in 5 wt % hydrochloric acid solution for about 10 hours so that the egg shells, mainly composed of calcium carbonate, were dissolved as described above. Then, the residual shell membranes were washed with distilled water to remove dust and the like, and then dried and washed with 0.1N sodium hydroxide so as to remove the egg white, yielding the egg shell membrane for the tests.

The feathers (feathers of fowl, in this case) or wool was washed with 0.1N to 0.5N sodium hydroxide to remove oil components, and then washed with distilled water, yielding the feathers or wool for the tests.

The liquid form of organism materials were obtained by immersing shell membranes, feathers or wool subjected to the above processes in 30 wt % sodium hydroxide solution for about 20 hours at ordinary temperature so as to be dissolved. The quantity to be dissolved was about 5 g of the organism material toward 50 cc of the sodium hydroxide solution.

In the experiment, the 25° C. desulfurized drain containing hexavalent Se at a concentration of 1.020 mg/l was continuously introduced into a reaction tank having an effective capacity of 20 l at a flow rate of 20 l/hr with stirring at 200 rpm.

The organism material was added in such a amount that the concentration of the organism material (solid or liquid) in the reaction tank becomes 2 g/l in terms of a solid material, the organism material was added, and $H_2SO_4$ or NaOH was added to adjust the pH in the reaction tank to a predetermined value. Then, the tests for removing hexavalent Se were performed.

Drain discharged from the reaction tank was sampled and filtered by a 1 μm glass filter, and then hexavalent Se in the filtrate was analyzed by the Se hydride-ICP analysis method. The results are shown in Table 4. Hexavalent Se in the drain, whose removal had been previously difficult, was significantly removed in a pH range of 4 to 6 by each of the organism materials.

TABLE 4

Results of Hexavalent Se Removal Test Using Organism Material

| | | Organism materials | | | | | |
| --- | --- | --- | --- | --- | --- | --- | --- |
| | | Shell membranes | | Feathers | | Wool | |
| Concentration of Hexavalent Se | | Solid | Liquid | Solid | Liquid | Solid | Liquid |
| Concentration of Hexvalent Si in Filtrate from Drain at Outlet of Reaction Tank (mg/l) | pH = 2 | 0.792 | 0.715 | 1.020 | 0.990 | 1.011 | 1.003 |
| | pH = 3 | 0.729 | 0.708 | 0.810 | 0.792 | 0.833 | 0.809 |
| | pH = 4 | 0.014 | 0.012 | 0.087 | 0.092 | 0.206 | 0.201 |
| | pH = 5 | 0.015 | 0.013 | 0.095 | 0.098 | 0.236 | 0.218 |
| | pH = 6 | 0.153 | 0.150 | 0.304 | 0.297 | 0.372 | 0.381 |
| | pH = 7 | 0.742 | 0.738 | 0.795 | 0.803 | 0.851 | 0.842 |
| | pH = 8 | 0.840 | 0.829 | 0.873 | 0.904 | 0.911 | 0.895 |

Although the principle that the adsorbent made of the organism material can adsorb Se has not been clarified, the following consideration may be applied. That is, the proteins constituting shell membrane, feather or wool have a crosslinking construction among their molecules, and have high chemical stability. Moreover, since the protein is composed of meshy fibers, the protein has an extremely large specific surface area. Since protein of the foregoing type includes NH groups and C=O groups of the peptide skeleton thereof and a $NH_3$ group, a COOH group, an OH group and a SH group of the branched chains thereof, their interactions cause the adsorbing performance of various ions at an appropriate pH. Accordingly, the organism material is not limited to shell membrane, feather or wool, thus organism materials having similar structure may be used as the adsorbent according to the present invention.

We claim:

1. A flue gas treatment system for treating flue gas containing sulfur dioxide, dust and Se, comprising a desulfurization apparatus having a desulfurization tower for bringing an absorbent slurry and the flue gas into a gas-liquid contact with each other so as to absorb sulfur dioxide; a dry dust precipitator for removing dust containing fly ash, tetravalent selenium and hexavalent selenium from the flue gas before the flue gas is introduced into said desulfurization tower of said desulfurization apparatus; an extractor for extracting a soluble component of the dust which has been removed by said dry dust precipitation apparatus, into water to slurry the dust; an insolubilizer supply for supplying an insolubilizer to a dust slurry which has been formed from the dust by said extractor so as to insolubilize at least tetravalent Se; an adsorbent supply for supplying an adsorbent to said dust slurry so as to adsorb at least hexavalent Se; and a solid-liquid separator for separating the dust slurry to which said insolubilizer and said adsorbent have been added by said supplies.

2. The flue gas treatment system claimed in claim 1, wherein a portion of liquid constituting the absorbent slurry in said desulfurization apparatus is introduced into said extractor so as to be used as solvent in said extractor, and a filtrate separated by said separator is recycled as liquid that constitutes the absorbent slurry in said desulfurization apparatus.

3. The flue gas treatment system claimed in claim 2 comprising a filter aid supply for supplying a filter aid to said dust slurry.

4. The flue gas treatment system claimed in claim 3, comprising an oxidation-reduction reaction controller for controlling an oxidation-reduction reaction in said desulfurization apparatus so as to carry out a minimum oxidation required to completely oxidize sulfur dioxide in the slurry of said desulfurization apparatus.

5. The flue gas treatment system claimed in claim 3, comprising a drain treatment apparatus for treating a drain from said desulfurization apparatus, wherein said drain treatment apparatus is provided with an insolubilizer supply for supplying an insolubilizer to said drain so as to insolubilize at least tetravalent Se, and an adsorbent supply for supplying an adsorbent composed of an organism material to said drain so as to adsorb at least hexavalent Se.

6. The flue gas treatment system claimed in claim 3, comprising a drain treatment apparatus for treating a drain from said desulfurization apparatus, wherein said drain treatment apparatus is provided with an insolubilizer supply for supplying an insolubilizer to the said drain so as to insolubilize at least tetravalent Se, and a fixed-floor type contact treatment tower in which an adsorbent for adsorbing at least hexavalent Se is packed in a fixed state and through which said drain is allowed to pass through.

7. The flue gas treatment system according to claim 2, comprising an oxidation-reduction reaction controller for controlling an oxidation-reduction reaction in said desulfurization apparatus so as to carry out a minimum oxidation required to completely oxidize sulfur dioxide in the slurry of said desulfurization apparatus.

8. The flue gas treatment system claimed in claim 7, comprising a drain treatment apparatus for treating a drain from said desulfurization apparatus, wherein said drain treatment apparatus is provided with an insolubilizer supply for supplying an insolubilizer to said drain so as to insolubilize at least tetravalent Se, and an adsorbent supply for supplying an adsorbent to said drain so as to adsorb at least hexavalent Se.

9. The flue gas treatment system claimed in claim 7, comprising a drain treatment apparatus for treating a drain from said desulfurization apparatus, wherein said drain treatment apparatus is provided with an insolubilizer supply for supplying an insolubilizer to the said drain so as to insolubilize at least tetravalent Se, and a fixed-floor type contact treatment tower in which an adsorbent for adsorbing at least hexavalent Se is packed in a fixed state and through which said drain is allowed to pass through.

10. The flue gas treatment system according to claim 2, comprising a drain treatment apparatus for treating a drain from said desulfurization apparatus, wherein said drain treatment apparatus is provided with an insolubilizer supply for supplying an insolubilizer to said drain so as to insolubilize at least tetravalent Se, and an adsorbent supply for supplying an adsorbent to said drain so as to adsorb at least hexavalent Se.

11. The flue gas treatment system according to claim 2, comprising a drain treatment apparatus for treating a drain from said desulfurization apparatus, wherein said drain treatment apparatus is provided with an insolubilizer supply for supplying an insolubilizer to the said drain so as to insolubilize at least tetravalent Se, and a fixed-floor type contact treatment tower in which an adsorbent for adsorbing at least hexavalent Se is packed in a fixed state and through which said drain is allowed to pass through.

12. The flue gas treatment system claimed in claim 1 comprising a filter aid supply for supplying a filter aid to said dust slurry.

13. The flue gas treatment system claimed in claim 12, comprising an oxidation-reduction reaction controller for controlling an oxidation-reduction reaction in said desulfurization apparatus so as to carry out a minimum oxidation required to completely oxidize sulfur dioxide in the slurry of said desulfurization apparatus.

14. The flue gas treatment system according to claim 13, comprising a drain treatment apparatus for treating a drain from said desulfurization apparatus, wherein said drain treatment apparatus is provided with an insolubilizer supply for supplying an insolubilizer to said drain so as to insolubilize at least tetravalent Se, and an adsorbent supply for supplying an adsorbent material to said drain so as to adsorb at least hexavalent Se.

15. The flue gas treatment system according to claim 13, comprising a drain treatment apparatus for treating a drain from said desulfurization apparatus, wherein said drain treatment apparatus is provided with an insolubilizer supply for supplying an insolubilizer to the said drain so as to insolubilize at least tetravalent Se, and a fixed-floor type contact treatment tower in which an adsorbent for adsorbing at least hexavalent Se is packed in a fixed state and through which said drain is allowed to pass through.

16. The flue gas treatment system claimed in claim 12, comprising a drain treatment apparatus for treating a drain from said desulfurization apparatus, wherein said drain treatment apparatus is provided with an insolubilizer supply for supplying an insolubilizer to said drain so as to insolubilize at least tetravalent Se, and an adsorbent supply for supplying an adsorbent to said drain so as to adsorb at least hexavalent Se.

17. The flue gas treatment system claimed in claim 12, comprising a drain treatment apparatus for treating a drain from said desulfurization apparatus, wherein said drain treatment apparatus is provided with an insolubilizer supply for supplying an insolubilizer to the said drain so as to insolubilize at least tetravalent Se, and a fixed-floor type contact treatment tower in which an adsorbent for adsorbing at least hexavalent Se is packed in a fixed state and through which said drain is allowed to pass through.

18. The flue gas treatment system according to claim 1, comprising an oxidation-reduction reaction controller for controlling an oxidation-reduction reaction in said desulfurization apparatus so as to carry out a minimum oxidation required to completely oxidize sulfur dioxide in the slurry of said desulfurization apparatus.

19. The flue gas treatment system claimed in claim 18, comprising a drain treatment apparatus for treating a drain from said desulfurization apparatus, wherein said drain treatment apparatus is provided with an insolubilizer supply for supplying an insolubilizer to said drain so as to insolubilize at least tetravalent Se, and an adsorbent supply for supplying an adsorbent to said drain so as to adsorb at least hexavalent Se.

20. The flue gas treatment system claimed in claim 18, comprising a drain treatment apparatus for treating a drain from said desulfurization apparatus, wherein said drain treatment apparatus is provided with an insolubilizer supply for supplying an insolubilizer to the said drain so as to insolubilize at least tetravalent Se, and a fixed-floor type contact treatment tower in which an adsorbent for adsorbing at least hexavalent Se is packed in a fixed state and through which said drain is allowed to pass through.

21. The flue gas treatment system according to claim 1, comprising a drain treatment apparatus for treating a drain from said desulfurization apparatus, wherein said drain treatment apparatus is provided with an insolubilizer supply for supplying an insolubilizer to said drain so as to insolubilize at least tetravalent Se, and an adsorbent supply for supplying an adsorbent to said drain so as to adsorb at least hexavalent Se.

22. The flue gas treatment system according to claim 1, comprising a drain treatment apparatus for treating a drain from said desulfurization apparatus, wherein said drain treatment apparatus is provided with an insolubilizer supply for supplying an insolubilizer to the said drain so as to insolubilize at least tetravalent Se, and a fixed-floor type contact treatment tower in which an adsorbent for adsorbing at least hexavalent Se is packed in a fixed state and through which said drain is allowed to pass through.

23. A flue gas treatment system for treating flue gas containing sulfur dioxide, dust and Se, comprising a desulfurization apparatus having a desulfurization tower for bringing an absorbent slurry and the flue gas into a gas-liquid contact with each other so as to absorb sulfur dioxide; a dry dust precipitator for removing dust fly ash, tetravalent selenium and hexavalent selenium from the flue gas before the flue gas is introduced into said desulfurization tower of said desulfurization apparatus; a dust introducer for introducing the dust removed by said dry dust precipitator into the absorbent slurry of said desulfurization apparatus; an insolubilizer supply for supplying an insolubilizer to the absorbent slurry so as to insolubilize at least tetravalent Se; and an adsorbent supply for supplying an adsorbent to the absorbent slurry so as to adsorb at least hexavalent Se.

24. The flue gas treatment system according to claim 23, comprising an oxidation-reduction reaction controller for controlling an oxidation-reduction reaction in said desulfurization apparatus so as to carry out a minimum oxidation required to completely oxidize sulfur dioxide in the slurry of said desulfurization apparatus.

25. The flue gas treatment system according to claim 23, comprising a drain treatment apparatus for treating a drain from said desulfurization apparatus, wherein said drain treatment apparatus is provided with an insolubilizer supply for supplying an insolubilizer to said drain so as to insolubilize at least tetravalent Se, and an adsorbent supply for supplying an adsorbent to said drain so as to adsorb at least hexavalent Se.

26. The flue gas treatment system according to claim 23, comprising a drain treatment apparatus for treating a drain from said desulfurization apparatus, wherein said drain treatment apparatus is provided with an insolubilizer supply for supplying an insolubilizer to the said drain so as to insolubilize at least tetravalent Se, and a fixed-floor type contact treatment tower in which an adsorbent for adsorbing at least hexavalent Se is packed in a fixed state and through which said drain is allowed to pass through.

27. A flue gas treatment system for treating flue gas containing sulfur dioxide, dust and Se, comprising a desulfurization apparatus having a desulfurization tower for bringing an absorbent slurry and the flue gas into a gas-liquid contact with each other so as to absorb sulfur dioxide, wherein the flue gas having dust, fly ash, tetravalent selenium and hexavalent selenium which has not been removed is introduced into said desulfurization tower; an insolubilizer supply for supplying an insolubilizer to the absorbent slurry in said desulfurization apparatus so as to insolubilize at least tetravalent Se; and an adsorbent supply for supplying an adsorbent to the absorbent slurry so as to adsorb at least hexavalent Se.

28. The flue gas treatment system according to claim 27, comprising an oxidation-reduction reaction controller for controlling an oxidation-reduction reaction in said desulfurization apparatus so as to carry out a minimum oxidation required to completely oxidize sulfur dioxide in the slurry of said desulfurization apparatus.

29. The flue gas treatment system according to claim 27, comprising a drain treatment apparatus for treating a drain from said desulfurization apparatus, wherein said drain treatment apparatus is provided with an insolubilizer supply for supplying an insolubilizer to said drain so as to insolubilize at least tetravalent Se, and an adsorbent supply for supplying an adsorbent to said drain so as to adsorb at least hexavalent Se.

30. The flue gas treatment system according to claim 27, comprising a drain treatment apparatus for treating a drain from said desulfurization apparatus, wherein said drain treatment apparatus is provided with an insolubilizer supply for supplying an insolubilizer to the said drain so as to insolubilize at least tetravalent Se, and a fixed-floor type contact treatment tower in which an adsorbent for adsorbing at least hexavalent Se is packed in a fixed state and through which said drain is allowed to pass through.

31. A flue gas treatment system for treating flue gas containing sulfur dioxide, dust and Se, comprising a desulfurization apparatus having a desulfurization tower for bringing absorbent slurry and flue gas into a gas-liquid contact with each other so as to absorb sulfur dioxide and also having a cooling and dust removal tower disposed upstream of said desulfurization tower so as to bring liquid and the flue gas into a gas-liquid contact with each other; a dry dust precipitator for removing dust fly ash, tetravalent selenium and hexavalent selenium from the flue gas, which will be introduced into said cooling and dust removal tower; a dust introducer for introducing the dust removed by said dry dust precipitator into the liquid of said cooling and dust removal tower of said desulfurization apparatus; an insolubilizer supply for supplying an insolubilizer to a dust slurry obtained by introducing said dust into said liquid so as to insolubilize at least tetravalent Se; an adsorbent supply for supplying an adsorbent to said dust slurry so as to adsorb at least hexavalent Se; and a separator for solid-liquid separating the dust slurry to which said insolubilizer and said adsorbent have been added by said supplies.

32. The flue gas treatment system according to claim 31, comprising an oxidation-reduction reaction controller for controlling an oxidation-reduction reaction in said desulfurization apparatus so as to carry out a minimum oxidation required to completely oxidize sulfur dioxide in the slurry of said desulfurization apparatus.

33. The flue gas treatment system according to claim 31, comprising a drain treatment apparatus for treating a drain from said desulfurization apparatus, wherein said drain treatment apparatus is provided with an insolubilizer supply for supplying an insolubilizer to said drain so as to insolubilize at least tetravalent Se, and an adsorbent supply for supplying an adsorbent material to said drain so as to adsorb at least hexavalent Se.

34. The flue gas treatment system according to claim 31, comprising a drain treatment apparatus for treating a drain from said desulfurization apparatus, wherein said drain treatment apparatus is provided with an insolubilizer supply for supplying an insolubilizer to the said drain so as to insolubilize at least tetravalent Se, and a fixed-floor type contact treatment tower in which an adsorbent for adsorbing at least hexavalent Se is packed in a fixed state and through which said drain is allowed to pass through.

35. A flue gas treatment system for treating flue gas containing sulfur dioxide, dust and Se, comprising a desulfurization apparatus having a desulfurization tower for bringing an absorbent slurry and flue gas into a gas-liquid contact with each other so as to absorb sulfur dioxide and also having a cooling and dust removal tower disposed in an upstream of said desulfurization tower so as to bring liquid and the flue gas into a gas-liquid contact with each other, wherein the flue gas having dust, fly ash, tetravalent selenium and hexavalent selenium, which has not been removed is introduced into said cooling and dust removal tower; an insolubilizer supply for supplying an insolubilizer to a dust slurry obtained by supplying the dust to the liquid of said cooling and dust removal tower so as to insolubilize at least tetravalent Se; an adsorbent supply for supplying an adsorbent to said dust slurry so as to adsorb at least hexavalent Se; and a separator for solid-liquid separating the dust slurry to which said insolubilizer and said adsorbent have been added by said supplies.

36. The flue gas treatment system according to claim 35, comprising an oxidation-reduction reaction controller for controlling an oxidation-reduction reaction in said desulfurization apparatus so as to carry out a minimum oxidation required to completely oxidize sulfur dioxide in the slurry of said desulfurization apparatus.

37. The flue gas treatment system claimed in claim 36, comprising a drain treatment apparatus for treating a drain from said desulfurization apparatus, wherein said drain treatment apparatus is provided with an insolubilizer supply for supplying an insolubilizer to said drain so as to insolubilize at least tetravalent Se, and an adsorbent supply for supplying an adsorbent to said drain so as to adsorb at least hexavalent Se.

38. The flue gas treatment system claimed in claim 36, comprising a drain treatment apparatus for treating a drain from said desulfurization apparatus, wherein said drain treatment apparatus is provided with an insolubilizer supply for supplying an insolubilizer to the said drain so as to insolubilize at least tetravalent Se, and a fixed-floor type contact treatment tower in which an adsorbent for adsorbing at least hexavalent Se is packed in a fixed state and through which said drain is allowed to pass through.

39. The flue gas treatment system according to claim 35, comprising a drain treatment apparatus for treating a drain from said desulfurization apparatus, wherein said drain treatment apparatus is provided with an insolubilizer supply for supplying an insolubilizer to said drain so as to insolubilize at least tetravalent Se, and an adsorbent supply for supplying an adsorbent material to said drain so as to adsorb at least hexavalent Se.

40. The flue gas treatment system according to claim 35, comprising a drain treatment apparatus for treating a drain from said desulfurization apparatus, wherein said drain treatment apparatus is provided with an insolubilizer supply for supplying an insolubilizer to the said drain so as to insolubilize at least tetravalent Se, and a fixed-floor type contact treatment tower in which an adsorbent for adsorbing at least hexavalent Se is packed in a fixed state and through which said drain is allowed to pass through.

* * * * *